US012731976B2

(12) United States Patent
Clark

(10) Patent No.: US 12,731,976 B2
(45) Date of Patent: Sep. 8, 2026

(54) CONNECTOR COVER ASSEMBLIES

(71) Applicant: Hubbell Incorporated, Shelton, CT (US)

(72) Inventor: Adam Joseph Clark, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 308 days.

(21) Appl. No.: 18/211,136

(22) Filed: Jun. 16, 2023

(65) Prior Publication Data

US 2023/0411946 A1 Dec. 21, 2023

Related U.S. Application Data

(60) Provisional application No. 63/405,254, filed on Sep. 9, 2022, provisional application No. 63/353,516, filed on Jun. 17, 2022.

(51) Int. Cl.

| | |
|---|---|
| ***H02G 15/113*** | (2006.01) |
| ***H01R 4/20*** | (2006.01) |
| ***H01R 4/2466*** | (2018.01) |
| ***H01R 4/2495*** | (2018.01) |
| ***H01R 4/70*** | (2006.01) |
| ***H01R 11/05*** | (2006.01) |
| ***H01R 11/09*** | (2006.01) |
| ***H01R 43/01*** | (2006.01) |
| ***H01R 43/058*** | (2006.01) |
| ***H02G 15/013*** | (2006.01) |

(52) U.S. Cl.

CPC ............. *H02G 15/113* (2013.01); *H01R 4/20* (2013.01); *H01R 4/2466* (2013.01); *H01R 4/2495* (2013.01); *H01R 4/70* (2013.01); *H01R 11/05* (2013.01); *H01R 11/09* (2013.01); *H01R 43/01* (2013.01); *H01R 43/058* (2013.01); *H02G 15/013* (2013.01)

(58) Field of Classification Search

None

See application file for complete search history.

(56) References Cited

U.S. PATENT DOCUMENTS 2,894,056 A * 7/1959 Bogese .................... H01R 4/70 403/291
3,032,603 A 5/1962 Whitley
(Continued)

FOREIGN PATENT DOCUMENTS

DE 102015207953 B4 2/2017
WO 2017198985 11/2017

OTHER PUBLICATIONS

Original and Translation of CN112805880 (Year: 2021).*
(Continued)

*Primary Examiner* — Timothy J. Dole
*Assistant Examiner* — Muhammed Azam
(74) *Attorney, Agent, or Firm* — Wissing Miller LLP

(57) ABSTRACT

An enclosure for containing an electrical connector connecting a plurality of conductors, the enclosure including a first enclosure portion and a second enclosure portion and at least one strain relief assembly for securing at least one of the plurality of conductors. The first enclosure portion and the second enclosure portion when joined are configured to receive the at least one strain relief assembly.

17 Claims, 29 Drawing Sheets

(56) References Cited

U.S. PATENT DOCUMENTS 3,617,615 A * 11/1971 Balzer .................... H02G 15/18 174/138 F
3,835,444 A * 9/1974 Plana ....................... H01R 4/70 439/392
4,029,896 A * 6/1977 Skinner ................. F24C 15/104 219/541
4,095,043 A * 6/1978 Martin ................... H01B 17/58 439/459
4,344,665 A * 8/1982 Racilla ................. H01R 4/2445 439/417
4,427,253 A * 1/1984 Smith .................. H01R 4/2408 439/413
4,581,480 A * 4/1986 Charlebois ........... H02G 15/117 174/92
4,875,874 A 10/1989 Windsor
4,975,081 A * 12/1990 Daly ....................... H01R 11/11 439/465
5,211,706 A * 5/1993 Polgar ................ H01R 13/5841 439/465
5,344,330 A 9/1994 Hoffman
5,591,046 A * 1/1997 Klein ................. H01R 13/5825 439/467
5,606,150 A * 2/1997 Radliff ................. H02G 15/113 174/92
5,632,081 A * 5/1997 Gerhard, Jr. ......... H01R 43/015 29/566.4
5,691,508 A * 11/1997 Radliff ................. H02G 15/113 439/399
5,839,911 A 11/1998 Dinkel
5,908,327 A 6/1999 Tsuji et al.
5,967,830 A 10/1999 Tsuji
5,971,792 A * 10/1999 Lin ........................ H01R 43/01 439/404
6,019,638 A 2/2000 Saka et al.
6,059,602 A 5/2000 Ward
6,111,201 A * 8/2000 Drane .................... H02G 15/18 174/92
6,168,457 B1 1/2001 Kim
6,280,235 B1 * 8/2001 Radliff ................. H02G 15/007 439/456
6,368,129 B1 4/2002 Wang et al.
6,416,348 B2 * 7/2002 Hio ...................... H01R 4/2466 439/406
6,538,204 B2 3/2003 Connor
6,948,976 B2 * 9/2005 Goodwin ............... H01R 13/52 439/607.41
7,141,738 B2 * 11/2006 Marsac ................ H02G 15/113 174/92
7,201,604 B1 4/2007 Amidon
7,442,064 B2 10/2008 Miwa et al.
7,477,826 B2 * 1/2009 Mullaney ............. H02G 15/013 385/134
7,507,108 B2 3/2009 Tsuji
7,603,018 B2 * 10/2009 Mullaney ............. H02G 15/115 174/59
8,270,799 B2 * 9/2012 Drouard ............... H02G 15/007 385/138
8,298,922 B2 * 10/2012 Schumann ........... H01R 13/502 438/467
8,714,994 B2 5/2014 Daily et al.
8,772,641 B2 * 7/2014 Badura ............. G02B 6/44785 361/826
8,979,568 B2 3/2015 Herbrechtsmeier
9,111,428 B2 * 8/2015 Fawcett ............. H01R 13/5812
9,509,067 B2 11/2016 Yamauchi et al.
9,707,927 B1 * 7/2017 Boughner ................ H01H 1/42
9,742,171 B2 * 8/2017 Nooner .............. H01R 13/5213
9,793,636 B2 10/2017 France et al.
10,069,286 B2 * 9/2018 Sone ........................ H02G 3/04
10,209,473 B2 * 2/2019 Bishop ............... G02B 6/44765
10,547,124 B2 1/2020 Robicheau et al.
10,840,615 B2 * 11/2020 Newman ............ H01R 13/5216
11,146,028 B2 * 10/2021 Egami .................... H01R 13/74
11,329,423 B2 5/2022 Chamura et al.
11,431,114 B2 * 8/2022 Newman ................. H01R 11/11
2006/0030210 A1 * 2/2006 Willing ............. H01R 13/5202 439/606
2010/0107407 A1 5/2010 Freakes
2016/0268723 A1 * 9/2016 Berengut ............. H01R 13/713
2018/0261944 A1 * 9/2018 Papageorge ....... H01R 13/5825
2019/0058265 A1 2/2019 Robicheau et al.
2019/0301710 A1 10/2019 Harris et al.
2019/0377140 A1 * 12/2019 Mathews ............. H01R 13/633
2020/0059013 A1 2/2020 Oishi
2020/0235498 A1 * 7/2020 Robicheau ............. H01R 9/031
2023/0198192 A1 * 6/2023 Li ........................ H01R 13/514 439/625
2023/0411946 A1 * 12/2023 Clark ................... H01R 43/058

OTHER PUBLICATIONS

Original and Translation of CN113270782 (Year: 2021).*
Original and translation of WO2016106065 (Year: 2016).*
International Preliminary Report on Patentability in related International Application No. PCT/US2023/025600 mailed Dec. 26, 2024. (8 pages).
International Preliminary Report on Patentability in corresponding International Application No. PCT/US2023/25607 mailed Dec. 26, 2024. (8 pages).
International Preliminary Report on Patentability in related International Application No. PCT/US2023/25601 mailed Dec. 26, 2024. (7 pages).
International Search Report and Written Opinion mailed Nov. 28, 2023 in corresponding application PCT/US2023/25600 (11 pages).
International Search Report and Written Opinion mailed Nov. 28, 2023 in corresponding application PCT/US2023/25607 (11 pages).
International Search Report and Written Opinion mailed Dec. 14, 2023 in corresponding application PCT/US2023/25601 (22 pages).
Partial European Search Report in corresponding European Application No. 23824663.1 mailed May 21, 2026. (19 pages).

* cited by examiner

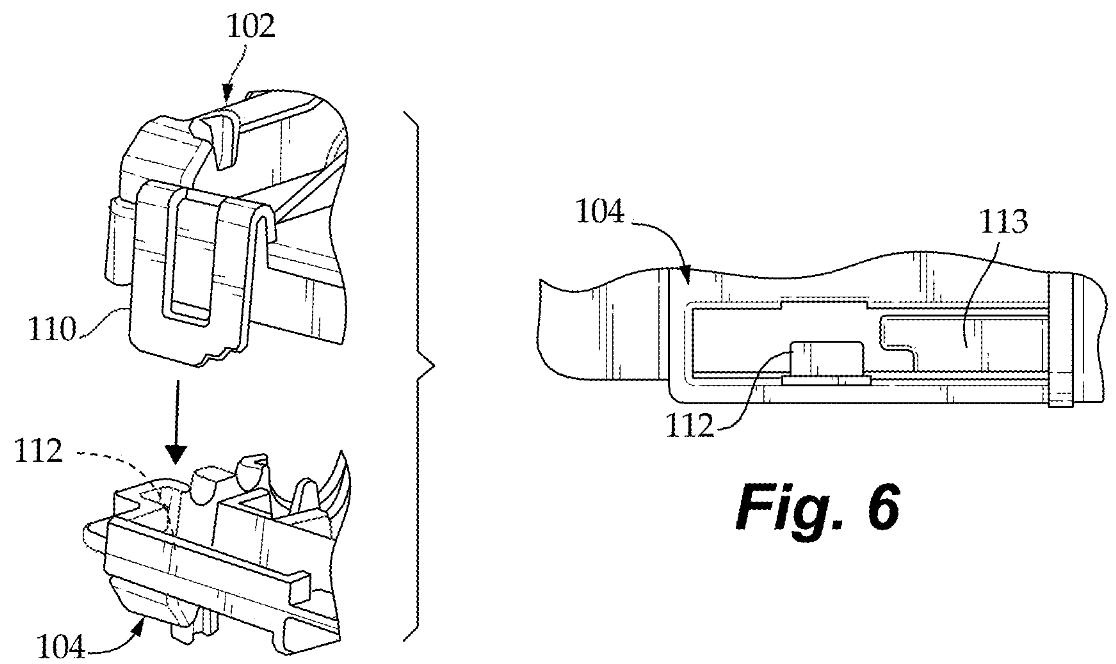
Fig. 5
Fig. 6
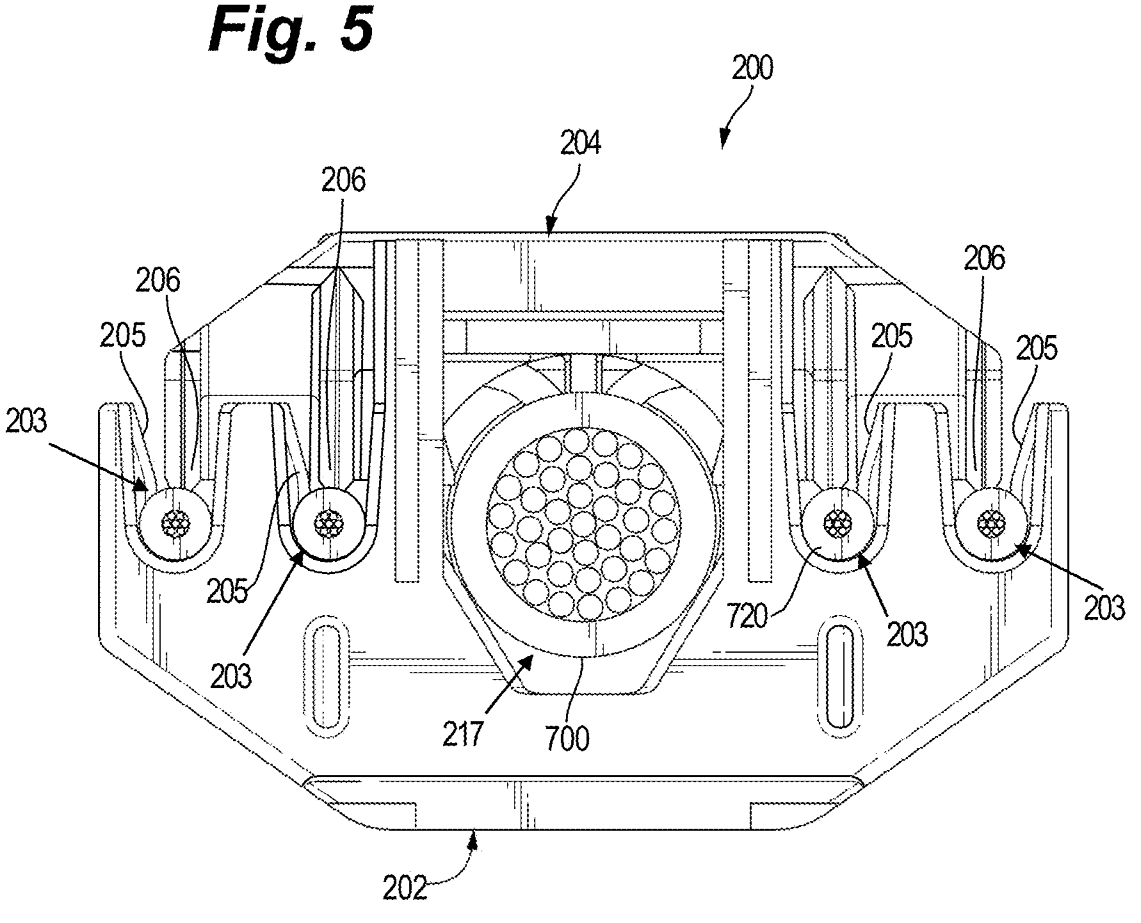
Fig. 7

630
636
640a
634
640
638a
638
638b
640
638a
632
640a 630
638
650a
634
636
640
640
638b
638a
640a
638a
640a
632

CONNECTOR COVER ASSEMBLIES

REFERENCE TO RELATED APPLICATIONS

This application is based on and claims priority to U.S. Provisional Application Ser. No. 63/353,516 filed Jun. 17, 2022 entitled COMPRESSION CONNECTORS and U.S. Provisional Application Ser. No. 63/405,254 filed Sep. 9, 2022 entitled COMPRESSION CONNECTORS AND PROTECTIVE COVERS the contents of each of which are incorporated herein in their entirety by reference.

BACKGROUND

Field

The present disclosure relates generally to connector covers and, more specifically, to connector cover assemblies.

Description of the Related Art

Tap connectors have been used to establish an electrical connection between a continuous main power conductor and a branch conductor. Compression type tap connectors are typically adapted to receive a branch or tap conductor, to engage a continuous run conductor, and to be compressed by a crimping tool to achieve the desired connection.

If the run conductor and the branch conductors crimped to the connector remain outside in the environment, damage to the connection can occur over time. In addition, having uninsulated or uncovered connectors and conductors exposes individuals to potential hazards including, for example, fires, burns, electric shock, etc. Accordingly, it would be desirable to place the crimped connection in a protective housing.

SUMMARY

An enclosure for containing an electrical connector connecting a plurality of conductors, the enclosure including a first enclosure portion and a second enclosure portion and at least one strain relief assembly for securing at least one of the plurality of conductors. The first enclosure portion and the second enclosure portion when joined are configured to receive the at least one strain relief assembly.

An enclosure for containing an electrical connector connecting a plurality of conductors. The enclosure includes a first enclosure portion and a second enclosure portion and a cable positioning assembly. The first enclosure portion and the second enclosure portion when joined form at least one cavity for receiving the cable positioning assembly.

An enclosure for containing an electrical connector connecting a plurality of conductors. The enclosure includes a first enclosure portion and a second enclosure portion, the first enclosure portion and the second enclosure portion when joined forming a connector cavity for receiving the electrical connector and the plurality of conductors, at least one strain relief assembly positionable with respect to the connector cavity and a seal member positionable between the first enclosure portion and the second enclosure portion when the first enclosure portion and the second enclosure portion are joined.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 5 is an enlarged view of a portion of the first cover half and the second cover half illustrating a locking feature of the cover assembly according to an exemplary embodiment of the present disclosure;

FIG. 6 is an enlarged elevation view of a portion of the second cover half of FIG. 1, illustrating a snap connect tab and a tab release arm of a locking-tab feature of the cover assembly;

FIG. 7 is a first end view of the cable strain relief assembly of FIG. 2 according to an illustrative embodiment of the present disclosure;

DETAILED DESCRIPTION

The present disclosure provides embodiments of enclosures for connectors used to electrically connect, for example, one or more branch or tap conductors to one or more run or main conductors. For ease of description, the connector (e.g., a compression connector) may be referred to as the "connector" in the singular and the "connectors" in the plural. The branch or tap conductors may be referred to as the "branch conductor" in the singular and the "branch conductors" in the plural. The main or run conductors may be referred to as the "run conductor" in the singular and the "run conductors" in the plural. It is noted that the run conductors are typically greater in size than the branch conductors. Further, the run conductors and the branch conductors can be solid conductors or they can be stranded conductors. Typically, the run conductors and branch conductors are stranded conductors. The ports, slots, channels, apertures or other openings in the compression connectors that receive the branch conductors may also be referred to as the "branch opening" in the singular and the "branch openings" in the plural. The ports, slots, channels, apertures or other openings in the compression connectors that receive the run conductors may also be referred to as the "run opening" in the singular and the "run openings" in the plural.

The present disclosure provides embodiments of cover assemblies used to encase the connector and run and branch conductors after being crimped. The present disclosure also provides embodiments of strain relief assemblies used to hold and support run conductors and branch conductors connected to a connector and installed in a cover assembly. The present disclosure also provides embodiments of cable positioners used to hold and support run conductors and branch conductors connected to a connector and installed in a cover assembly.

The covers described herein enclose connectors used to connect conductors to protect the connectors and the electrical connections they make from the environment. While the present disclosure refers to compression connectors, it will be appreciated aspects of the enclosures described herein may be used for enclosing any suitable type of connector used to connect conductors.

While the present disclosure references branch and run as well as branch and run conductors for ease of reference, it will be appreciated the various embodiments of the connectors and enclosures described herein would be suitable for mechanically and electrically joining any one conductor to any one or more other conductors regardless of the nomenclature assigned thereto and for enclosing the same.

Figures 22A, 22B:
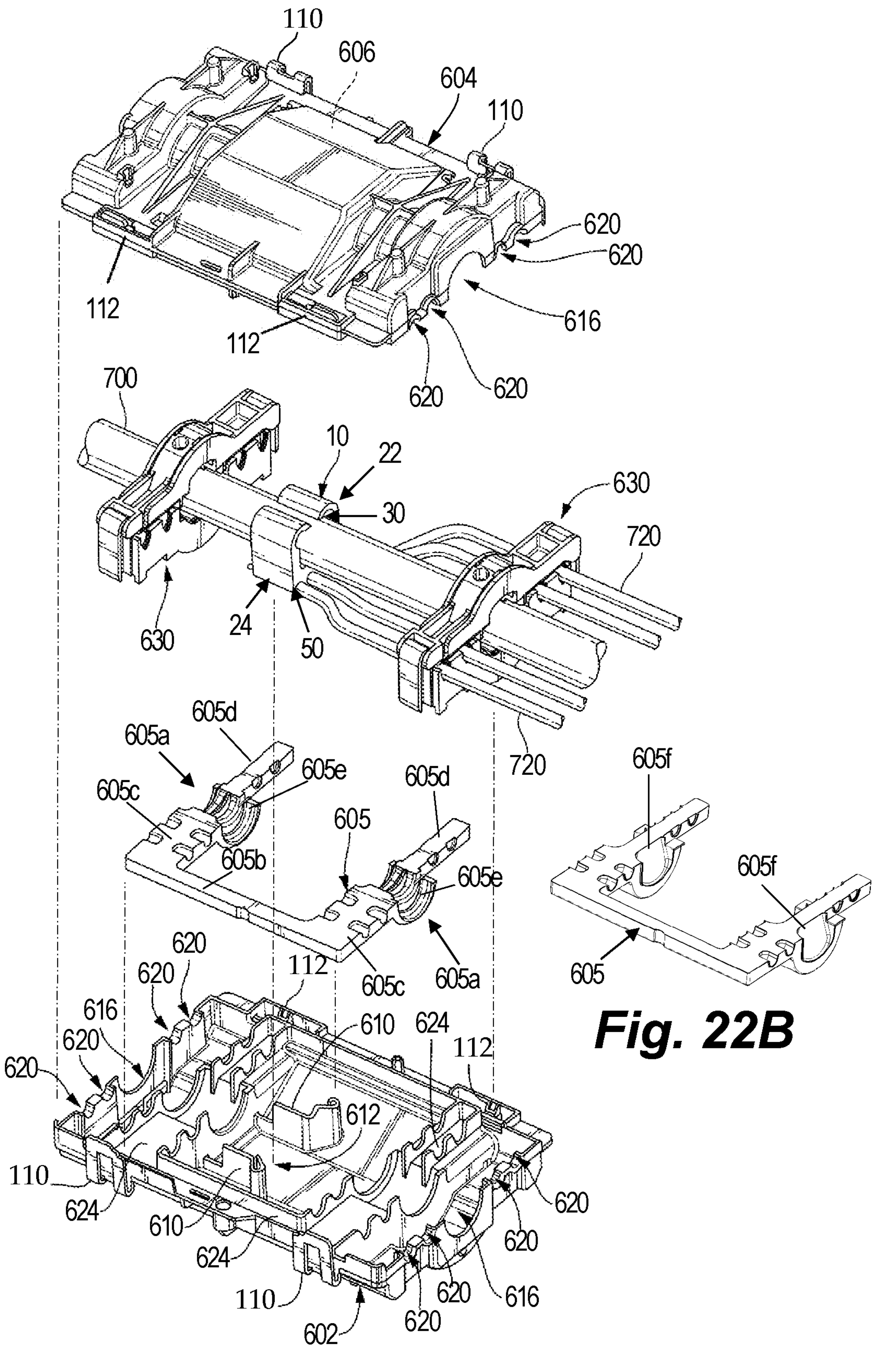
FIG. 22A, is an exploded perspective view of the cover assembly of FIG. 21, illustrating the first cover half, a seal member to be positioned in the first cover half, multiple strain relief assemblies and a connector and electrical conductors and the second cover half according to an illustrative embodiment of the present disclosure.
FIG. 22B is an elevated perspective view of a seal member according to another illustrative embodiment of the present disclosure.

A non-limiting example of a compression connector is shown in FIG. 22A and is referred to herein as connector 10. Connector 10 includes a body having a run conductor portion 22 and a branch conductor portion 24. The run conductor portion 22 generally includes two side walls and a bottom wall that form or define a portion of the run conductor opening 30. A portion of the side walls are configured and dimensioned so that side walls can be shaped during a crimping process so that the tips of the side walls may pierce through an insulating jacket of the run conductor 700 and contact the electrical wire of the run conductor. According to this non-limiting example, the run conductor portion 22 may be a substantially U-shaped like structure with a first portion of the side walls and the bottom wall configured, dimensioned and shaped so that the run opening 30 can receive a run conductor. As a non-limiting example, the size of the run conductor 700 can range from about 250 Kcmil to about 750 Kcmil. With a 250 Kcmil run conductor, the side walls and the bottom wall are configured, dimensioned and shaped to form a run conductor opening 30 sufficient to receive the 250 Kcmil run conductor. With a 750 Kcmil run conductor 700, the side walls and the bottom wall are configured, dimensioned and shaped to form a run opening sufficient to receive the 750 Kcmil run conductor. The bottom wall of the connector 10 may include one or more insulation piercing members (not shown) that extend into the run conductor opening 30. Each insulation piercing member may include an insulation piercing tip that is configured and dimensioned to pierce or cut through the insulating jacket of the run conductor to create an electrical path between the run conductor and the connector 10. The one or more insulation piercing members may be integrally or monolithically formed into the bottom wall of connector 10 such that the one or more insulation piercing members extend into the run opening 30. In addition or alternatively one or more of the insulation piercing members may be secured to or attached to the bottom wall of connector 10 so that the one or more insulation piercing members extend into the run opening.

The insulation piercing members may be generally triangular in shape. However, the insulation piercing members may come in different shapes and sizes configured and dimensioned to pierce or cut through the insulating jacket surrounding electrical wires of the run conductor, such as a cone-shaped member or a member with a pointed tip.

The branch connector portion 24 of connector 10 includes one or more branch conductor openings 50. Each branch conductor opening 50 can be configured and dimensioned to receive one or more branch conductors 720. In the embodiment shown, the branch conductor portion 24 includes four branch conductor openings 50. Each branch conductor opening 50 extends along the width of the body of connector 10.

After a crimping process, connector 10 substantially resembles that depicted in FIG. 22A. In particular, the side walls of the run conductor portion 22 of connector 10 are shaped during a crimping process so that the tips of the side walls may pierce through an insulating jacket of the run conductor 700 and contact the electrical wire of the run conductor providing a secure mechanical and electrical connection between the run conductor 700 and the connector 10. In addition, during this process, the branch connector portion 24 is crimped or compressed securing the one or more branch conductors 720 and providing a secure mechanical and electrical connection between the one or more branch conductors 720 and the connector 10.

To ensure longevity of the connection of the run conductor 700 and the one or more branch conductors 720 to the connector 10, it is desirable to protect the crimped connection from the environment. According to an embodiment of the present disclosure, the crimped connector may be placed in a suitable cover assembly to protect the connector and the connected portions from the elements. The cover assembly also protects individuals from hazards associated with having exposed electrical connections.

A cover assembly according to an illustrative embodiment of the present disclosure is shown in FIGS. 1-6 and is referred to generally as cover assembly 100. Cover assembly 100 is configured to snap together and cover the connector 10 providing a protective enclosure protecting the contents from the environment. For example, the cover assembly 100 is designed to limit or prevent water penetration. Preferably, the cover is configured as a single piece of injection molded plastic that is self-mating. That is, there are two identical cover pieces that connect or mate to one another to form the complete cover assembly when one of the pieces is rotated. For example, a first cover half may be rotated 180 degrees along its longitudinal and/or lateral axes and then connected or mated with the second cover half. The connector 10 and/or conductors may be positioned with respect to a strain relief assembly and/or a cable positioning assembly which is then received and enclosed by cover assembly 100.

The cover assembly 100 has a first cover half 102 and a second cover half 104 configured and dimensioned to connect to each other. Preferably, the first cover half 102 and second cover half 104 are identical to simplify the manufacture of the cover assembly. For the purposes of the present disclosure and ease of description, the first cover half 102 and second cover half 104 are considered identical such that the description of the first cover half 102 is the same for the second cover half 104. In the embodiment shown, each of the first cover half 102 and second cover half 104 has a cavity 106 that is preferably centrally located in the first cover half 102 and the second cover half 104. The cavity 106 is configured and dimensioned to receive at least a portion of a cable strain relief 200 and/or a cable positioning assembly 300 to be described later below. When the first cover half 102 is joined, connected or mated with the second cover half 104, the two cavities 106 are joined to form a pocket 108.

The first cover half 102 and the second cover half 104 may each include one or more alignment pins 115 and one or more alignment openings 119. The one or more alignment openings 119 of the first cover half 102 are positioned and dimensioned to receive the one or more alignment pins 115 of the second cover half 104 when the first cover half 102 is joined, connected or mated with the second cover half 104. The one or more alignment openings 119 of the second cover half 104 are positioned and dimensioned to receive the one or more alignment pins 115 of the first cover half when the first cover half 102 is joined, connected or mated with the second cover half 104. Cover assembly 100 may also include a locking-tab feature that once snapped tight, the locking-tab would need to be manually lifted before the snap can be opened. More specifically, and referring to FIGS. 3-6, the first cover half 102 and the second cover half 104 include one or more snap connect arms 110 and one or more corresponding snap connect tabs 112. The one or more snap connect arms 110 on the first cover half 102 are configured to interconnect with corresponding snap connect tabs 112 on the second cover half 104, and the one or more snap connect arms 110 on the second cover half 104 are configured to interconnect with corresponding snap connect tabs 112 on the first cover half 102. To release a snap connect arm 110 from a snap connect tab 112, the first cover half 102 and the second cover half 104 may include a tab release arm 113, seen in FIG. 6. The tab release arm 113 blocks movement of the snap connect arm 110 relative to the snap connect tab 112 to help maintain the interconnection between the snap connect arm 110 and the snap connect tab 112. By moving, e.g., flexing, the tab release arm 113 in a direction away from the cover assembly 100, e.g. in the direction of arrow "X," (see FIG. 4) the free end 110*a* of the snap connect arm 110 can be flexed so that the snap connect tab 112 can be released from the snap connect arm 110, thus releasing the interconnection between the snap connect arm 110 and the snap connect tab 112 and permitting the first cover half 102 to be separated from the second cover half 104.

Figure 1:
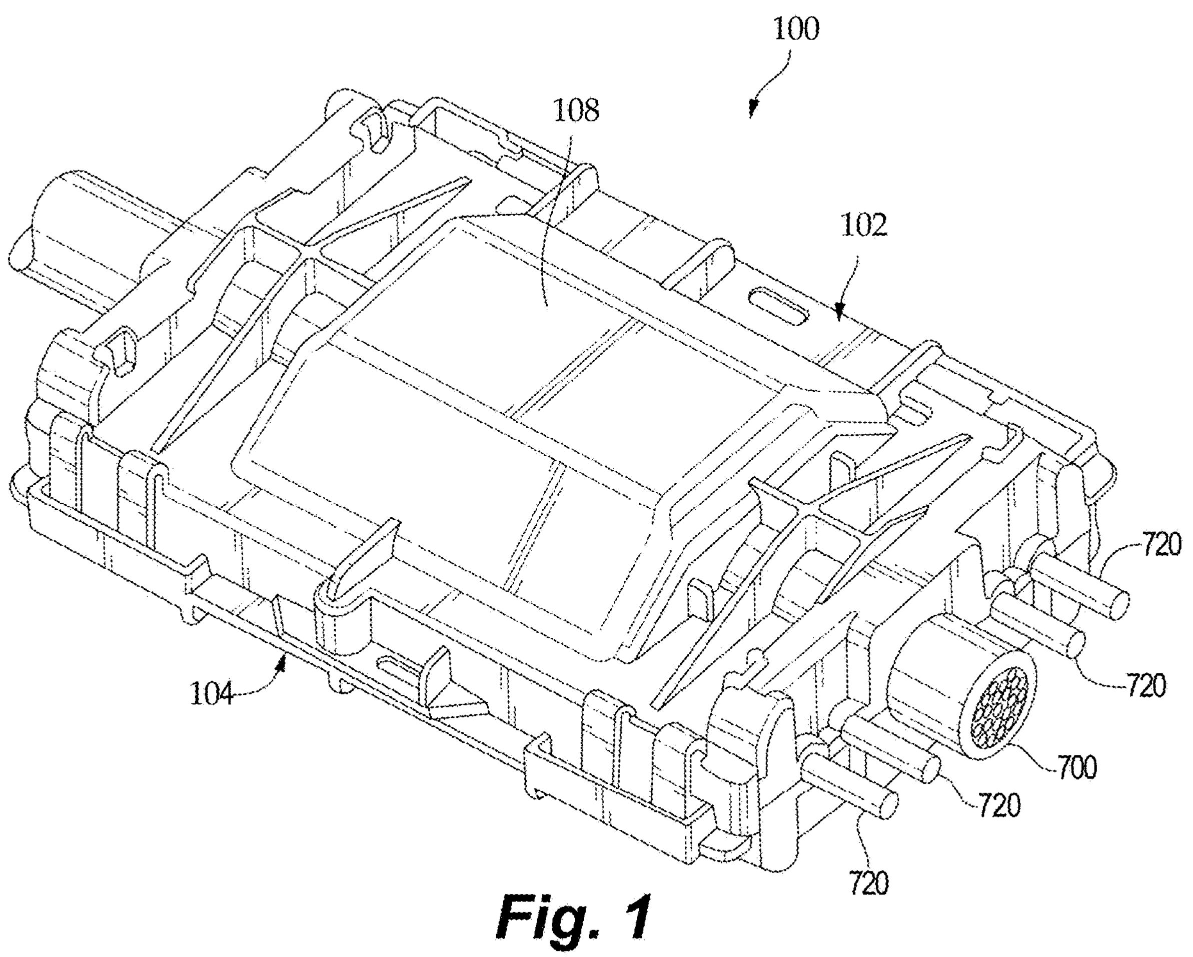
FIG. 1 is a perspective view of an exemplary embodiment of a cover assembly illustrating a first cover half mated to a second cover half according to an illustrative embodiment of the present disclosure.
Figure 2:
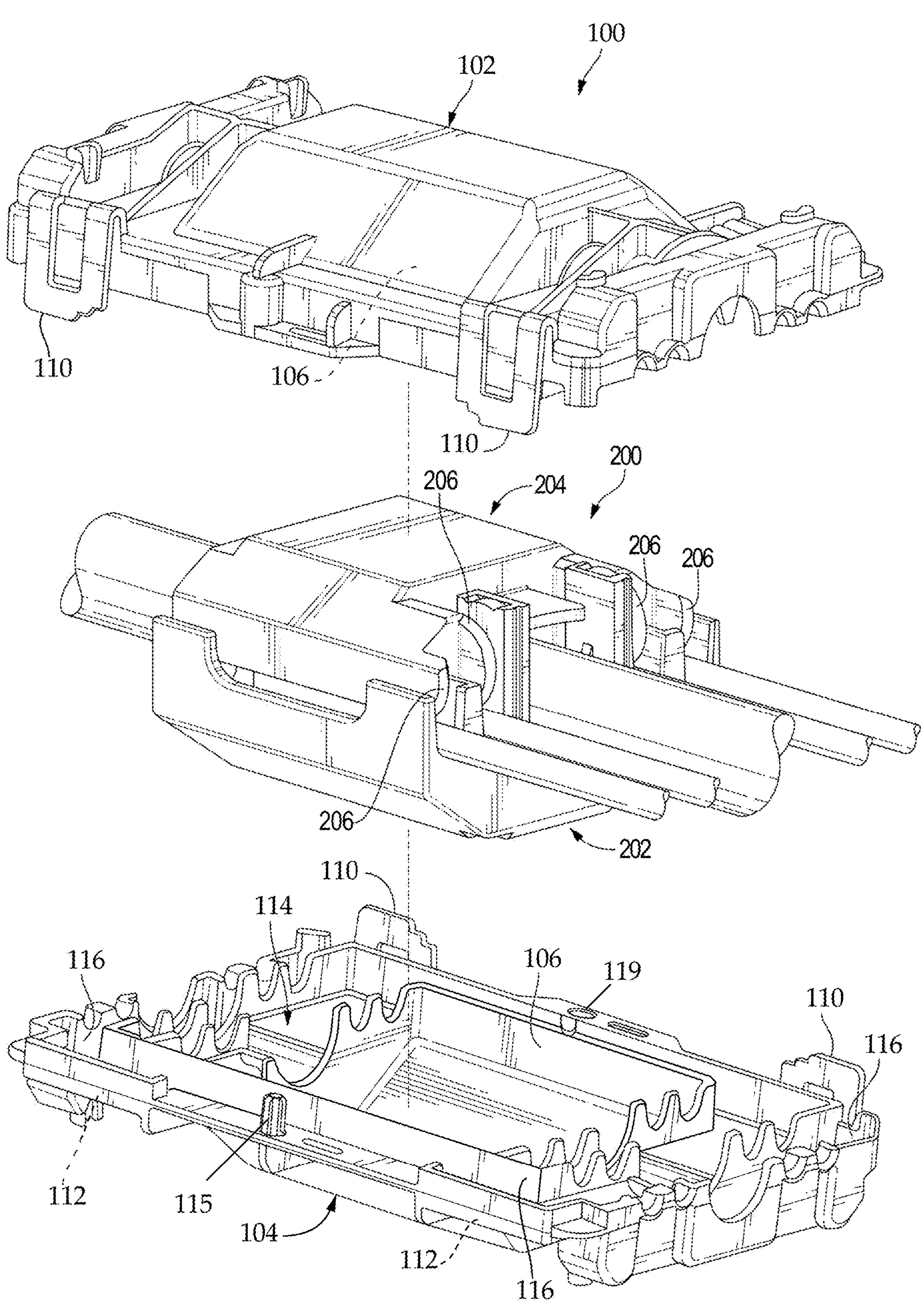
FIG. 2 is an exploded perspective view of the cover assembly of FIG. 1, illustrating the first cover half separated from the second cover half and a strain relief assembly therebetween according to an illustrative embodiment of the present disclosure.
Figure 3:
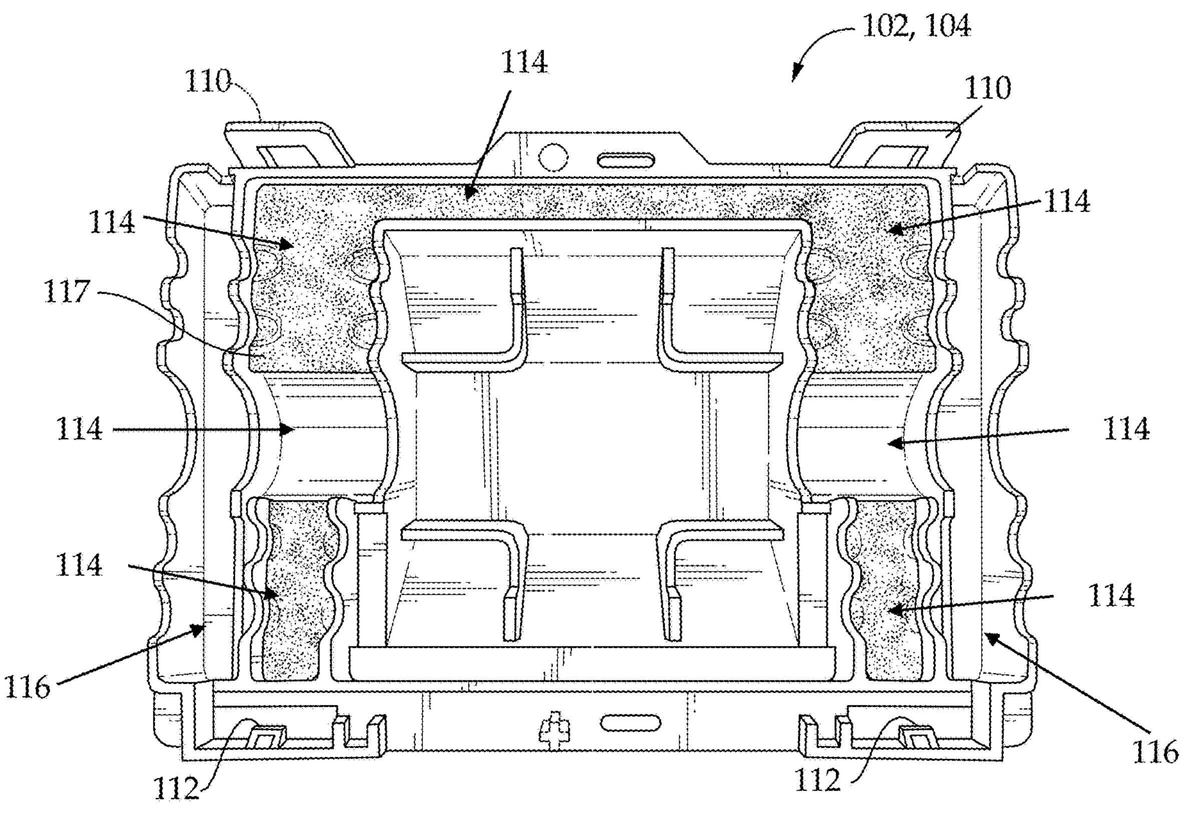
FIG. 3 is an inside view of the first or second cover half of FIG. 1 according to an illustrative embodiment of the present disclosure.
Figure 4:
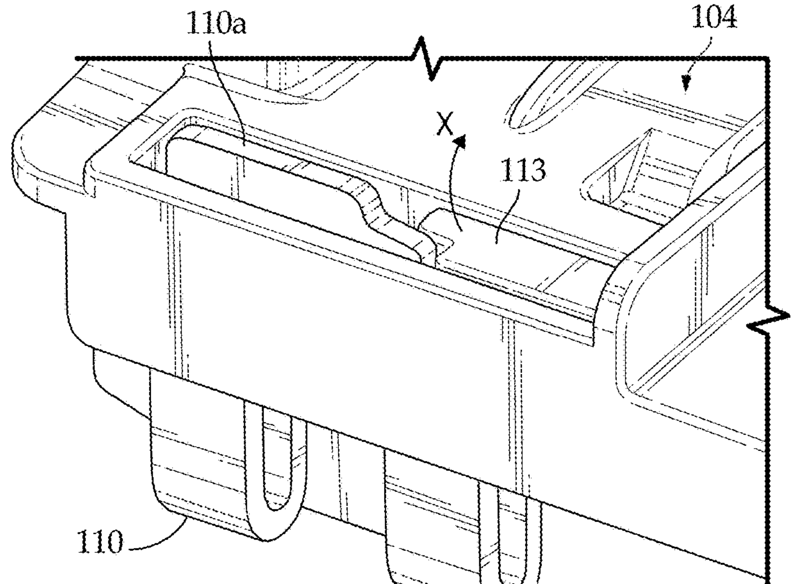
FIG. 4 is an enlarged perspective view of the portion of the first cover half and the second cover half of FIG. 1, illustrating the first cover half locked to the second cover half according to an illustrative embodiment of the present disclosure.

The interior of cover assembly 100 may also include ledges, channels or other features that may be filled with a gel such as a silicone-based gel insulating material for sealing the cover assembly 100 and limiting or preventing intrusion of water into the cover assembly 100. Referring to FIG. 3 for example, ledges, channels or other features 114 are provided around the perimeter of each cover half 102 and 104. The ledges, channels or other features 114 can be filled with a seal member 117 such as a silicone-based gel insulating material. The seal members 117 positioned in the first cover half 102 and the second cover half 104 abut and provide a seal around the run conductor 700 and branch conductors 720 when the two cover halves 102, 104 are joined, connected or mated together and limits and possibly prevents water from entering the pocket 108. Having the silicone gel material around the perimeter of the cover assembly instead of completely filling the cover volume with silicone gel material reduces the amount of gel material required and also limits and possibly prevents the gel material from contacting the connector 10 and the run and branch conductors located in the pocket of the cover assembly 100. Each cover half 102 and 104 may include one or more channels 116 positioned outside of the gel perimeter 114 to catch any gel material that may overflow or leak when the channels are filled with the gel material and/or when the cover halves 102 and 104 are joined, connected or mated to form the cover assembly 100.

Figure 8:
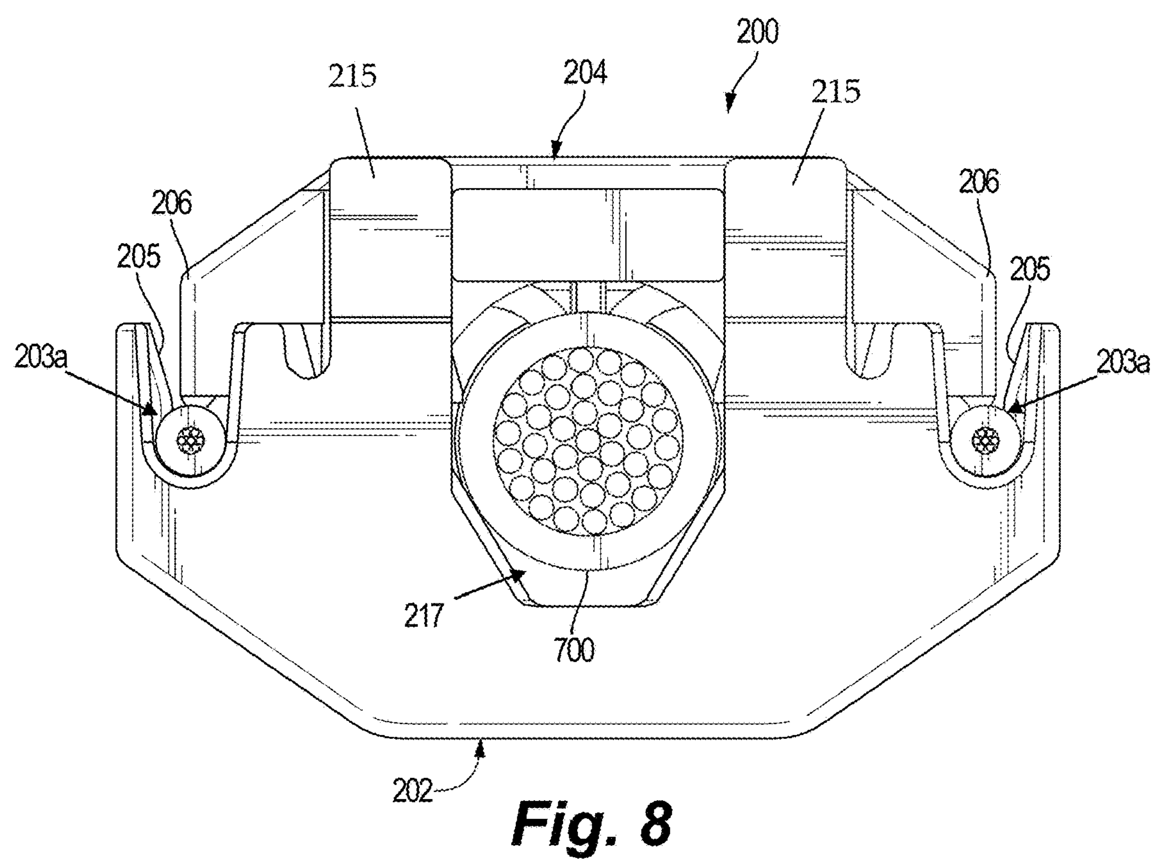
FIG. 8 is second end view of the cable strain relief assembly of FIG. 2 according to an illustrative embodiment of the present disclosure.
Figure 9:
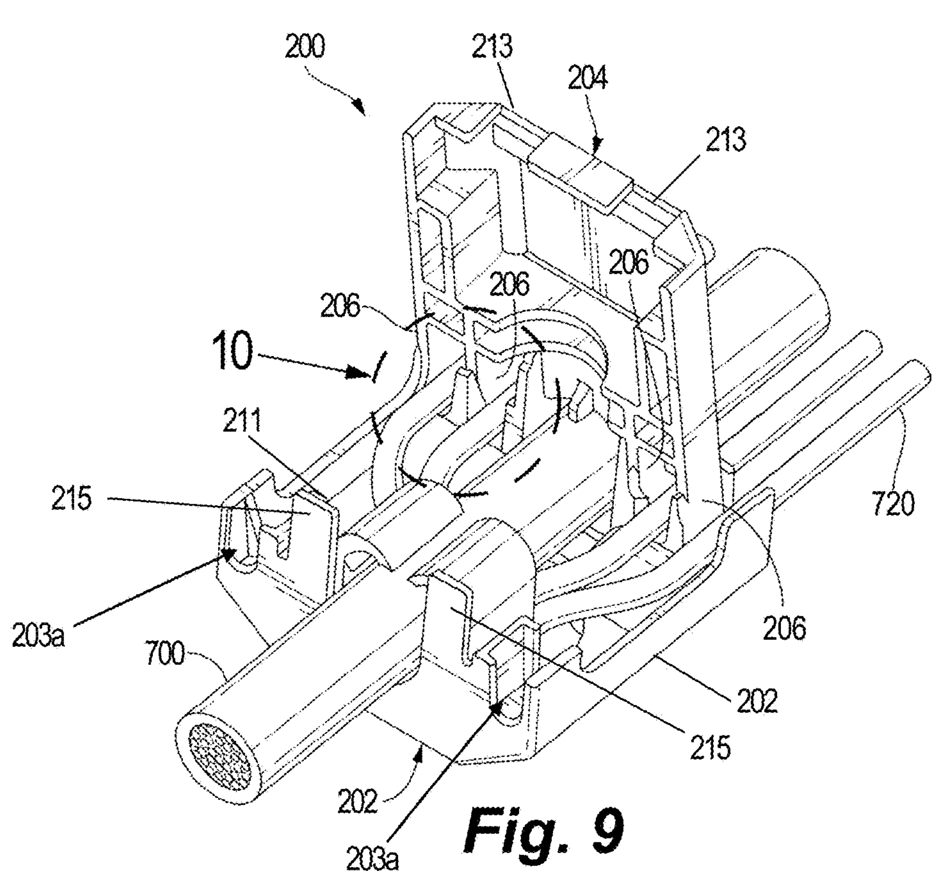
FIG. 9 is a perspective view of the cable strain relief assembly of FIG. 2, illustrating the movable cover of the housing in an open position revealing a compression connector crimped to a run conductor and branch conductors according to an illustrative embodiment of the present disclosure.
Figures 10, 11:
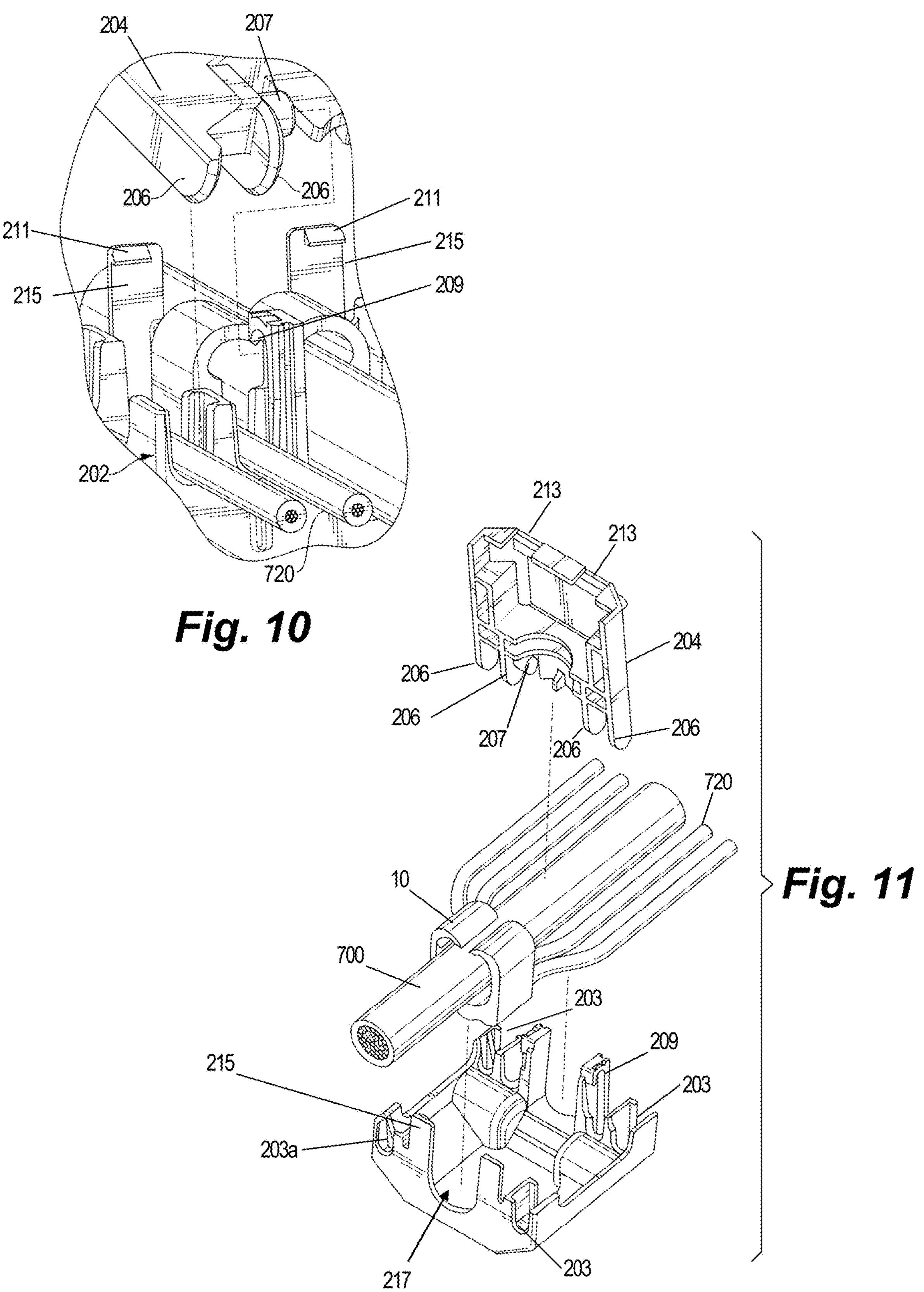
FIG. 10 is an enlarged view of a portion of the cable strain relief assembly of FIG. 9 according to an illustrative embodiment of the present disclosure.
FIG. 11 is an exploded view of the cable strain relief assembly of FIG. 2 according to an illustrative embodiment of the present disclosure.
Figure 12:
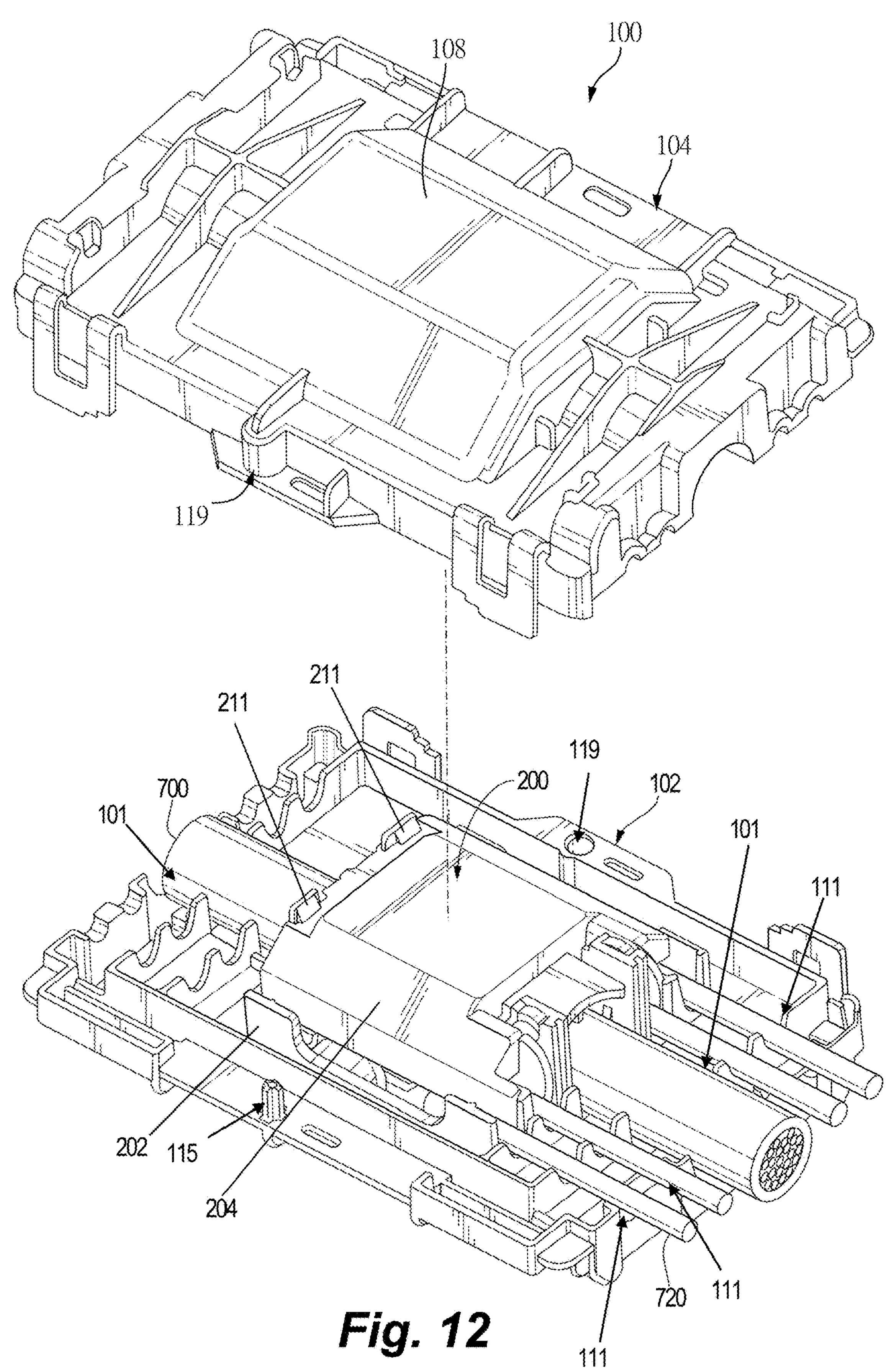
FIG. 12 is perspective view of the cable strain relief assembly of FIG. 2 positioned in the first cover half with the second cover half positioned above according to an illustrative embodiment of the present disclosure.

Referring now to FIGS. 7-12, an exemplary embodiment of a strain relief assembly according to the present disclosure is shown and is referred to as strain relief assembly 200. The strain relief assembly 200 is provided to properly position the branch conductors 720 and the run conductor 700 and to firmly secure the branch conductors 720 and the run conductor 700 in the cover assembly 100 and to provide protection from heavy external loads on the conductors. In this exemplary embodiment, the strain relief assembly 200 is a two-piece unit that is preferably made of a non-conductive material such as plastic. The strain relief assembly 200 has a base 202 and a movable lid 204. Base 202 is configured and dimensioned to receive the connector 10 and the run conductor 700 and one or more branch conductors 720. Base 202 includes one or more conductor-holding wedge members 205 that extend from the walls forming conductor channels 203. In particular, the conductor-holding wedge members 205 serve to hold and maintain the branch conductors 720 within the conductor channels 203 of base 202. As shown in FIG. 7, one end of strain relief assembly 200 includes at least one and in this case four conductor channels 203, each capable of receiving a branch conductor 720. The opposite end of strain relief assembly 200 is depicted in FIG. 8 and as shown, includes at least one and in this case two conductor channels 203*a*, each capable of receiving a branch conductor 720. Each end of strain relief assembly 200 also includes a run conductor channel 217 for receiving run conductor 700. After connector 10 and the run conductor 700 and branch conductors 720 are positioned in base 202, a lid 204 can be attached. The lid 204 attaches to the base 202 in a vertical open position and includes off-center cams 206. The off-center cams 206 contact the branch conductors 720 and provide a strong force to firmly push the branch conductors 720 into the conductor channels 203 and against the one or more conductor-holding wedge members 205 when the lid 204 is moved from the open position to the closed position. More specifically, as shown in FIG. 10, pins 207 extend from an upper portion of off-center cams 206 and are rotatably seated in notches 209 in base 202. Closing the lid 204 provides a mechanical advantage through the off-center cams 206 to firmly press the branch conductors 720 into conductor channels 203 and against the conductor-holding wedge members 205 to firmly hold the conductors within the strain relief assembly 200. The lid 204 is connected to the base 202 using a snap connect mechanism that snaps onto the base 202 when the lid 204 is fully closed. When lid 204 is rotated to the closed position, one or more snap clips 211 extending from arms 215 of base 202 engage snap lips 213 in lid 204 effectively locking lid 204 to base 202. The assembled strain relief assembly 200 and the run conductors and branch conductors can then be positioned in cover half 102 as shown in FIG. 12. For example, strain relief assembly 200 is positioned within cavity 106 and the branch conductors 720 are positioned in channels 111 and run conductor 700 is positioned within channels 101. Second cover half 104 is then aligned over the first cover half 102 with the aid of alignment pins 115 and alignment openings 119 in each cover half. The first cover half 102 and the second cover half 104 are snapped together using the one or more snap connect arms 110 and one or more corresponding snap connect tabs 112 as described above.

Figure 13:
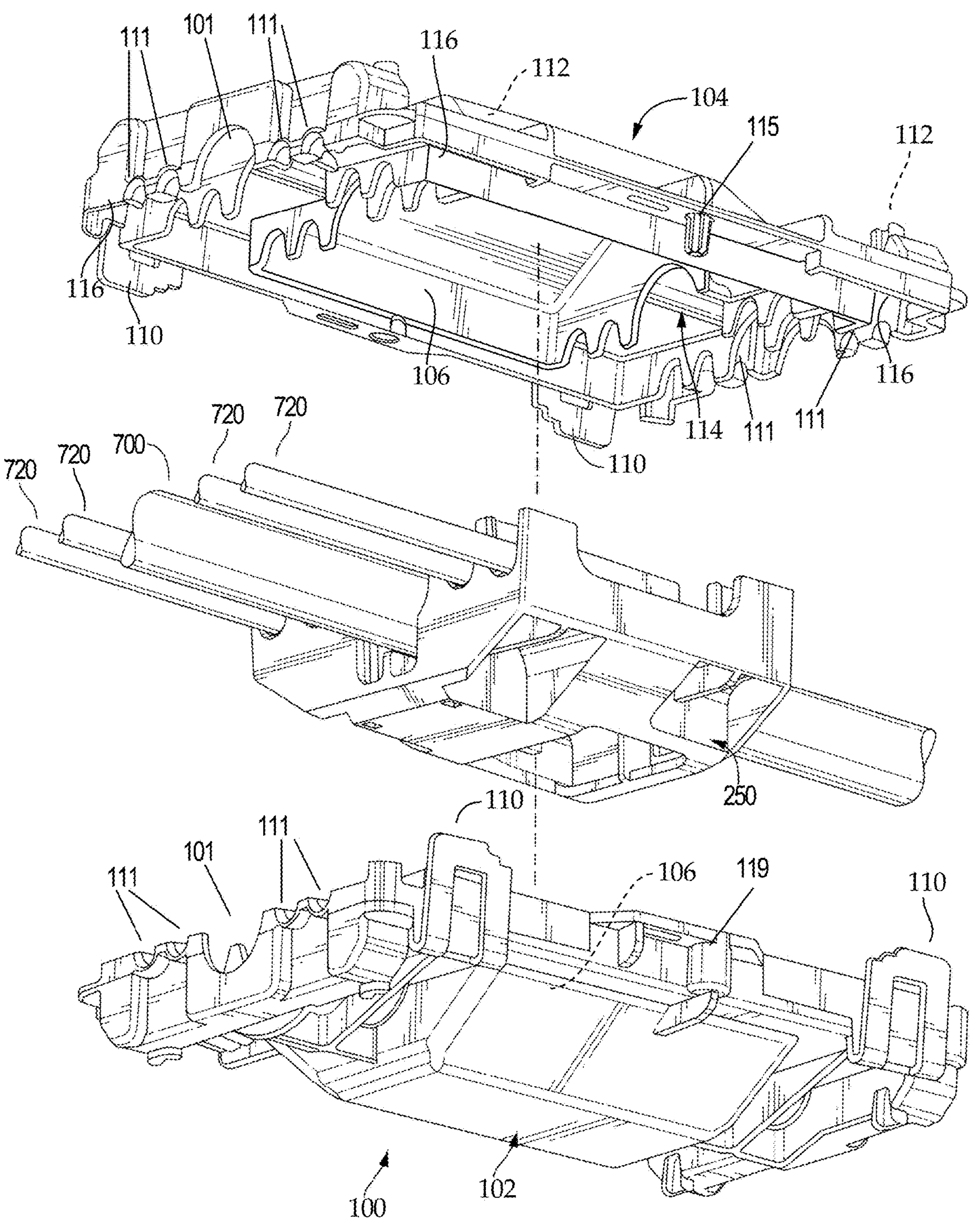
FIG. 13 is perspective view of the first cover half and the second cover half of the cover assembly of FIG. 1 and another exemplary embodiment of a cable strain relief assembly according to an illustrative embodiment of the present disclosure.
Figure 14:
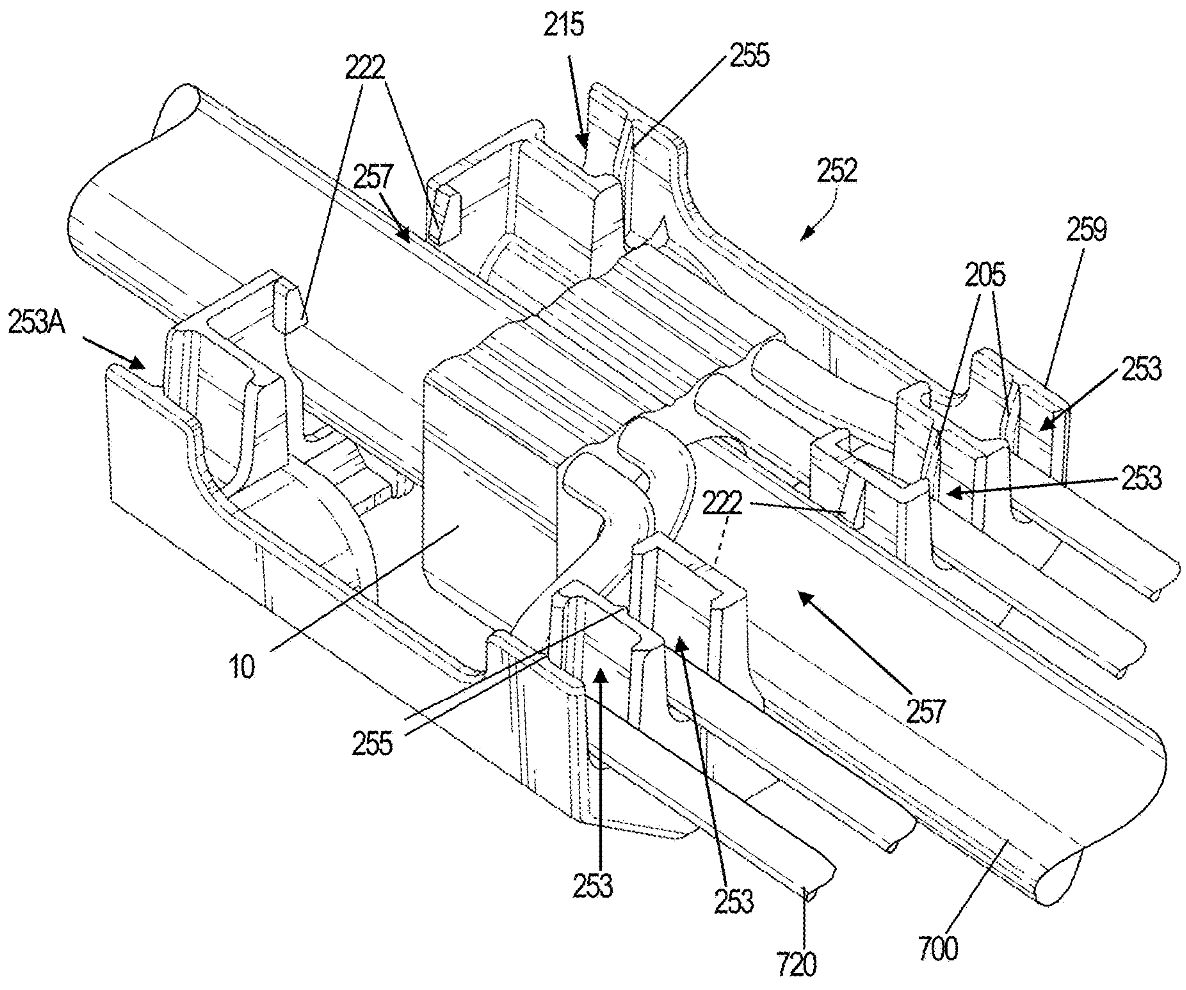
FIG. 14 is a perspective view of an interior of the strain relief assembly depicted in FIG. 13 depicting the connector and conductors positioned therein according to an exemplary embodiment of the present disclosure.

Referring now to FIGS. 13 and 14, an exemplary embodiment of a strain relief assembly according to the present disclosure is shown and is referred to as strain relief assembly 250. The strain relief assembly 250 is provided to properly position the branch conductors 720 and the run conductor 700 and to firmly secure the branch conductors 720 and the run conductor 700 in the cover assembly 100 and to provide protection from heavy external loads on the conductors. In this exemplary embodiment, the strain relief assembly 250 is a one-piece unit that is preferably made of a non-conductive material such as plastic. The strain relief assembly 250 has a base 252 configured and dimensioned to receive the connector 10 and the run conductor 700 and one or more branch conductors 720. Base 252 includes one or more conductor-holding wedge members 255 that extend from one or more of the walls 259 forming conductor channels 253. In particular, as a branch conductor is manually pressed into a conductor channel 253 and against the conductor-holding wedge member 255, the branch conductor 720 gets pinched between the wedge member 255 and the wall 259 opposite thereto. In addition, the branch conductors 720 are bent in an S-shaped fashion when being positioned within base 252. This pinching action and the S-shaped bend on the branch conductors serves to hold and maintain the branch conductors 720 within the conductor channels 253 of base 252. As shown in FIG. 14, one end of strain relief assembly 250 includes at least one and in this case four conductor channels 253, each capable of receiving a branch conductor 720. The opposite end of strain relief assembly 250 includes at least one and in this case two conductor channels 253A, each capable of receiving a branch conductor 720. Each end of strain relief assembly 250 also includes a run conductor channel 257 for receiving and securing run conductor 700. Each run conductor channel 257 includes tabs 222 which extend into the run conductor channels 257. Tabs 222 help secure base 252 to run conductor 700. After connector 10 and the run conductor 700 and branch conductors 720 are positioned in base 252, the assembled strain relief assembly 250 and the run conductors and branch conductors can then be positioned in cover half 102 as shown in FIG. 13. For example, strain relief assembly 250 is positioned within cavity 106 of first cover half 102 and the branch conductors 720 are positioned in channels 111 and run conductor 700 is positioned within channels 101. Second cover half 104 is then aligned over the first cover half 102 with the aid of alignment pins 115 and alignment openings 119 in each cover half. The first cover half 102 and the second cover half 104 are snapped together using the one or more snap connect arms 110 and one or more corresponding snap connect tabs 112 as described above.

Referring now to FIGS. 15-18, an exemplary embodiment of a cable positioning assembly according to the present disclosure is shown and is referred to as cable positioning assembly 300. The cable positioning assembly 300 can be provided to facilitate the positioning of the conductors for installation in the cover assembly 100 and can provide strain relief. The cable positioning assembly 300 may be used in place of the strain-relief assembly 200 described above. The cable positioning assembly 300 is preferably constructed from a single piece of injection molded plastic and designed and dimensioned to nest in the inside of the assembled cover 100. The cable positioning assembly 300 may be configured to position the conductors horizontally to line up with the wire channels 101 and 111 in the cover assembly 100.

Figure 16:
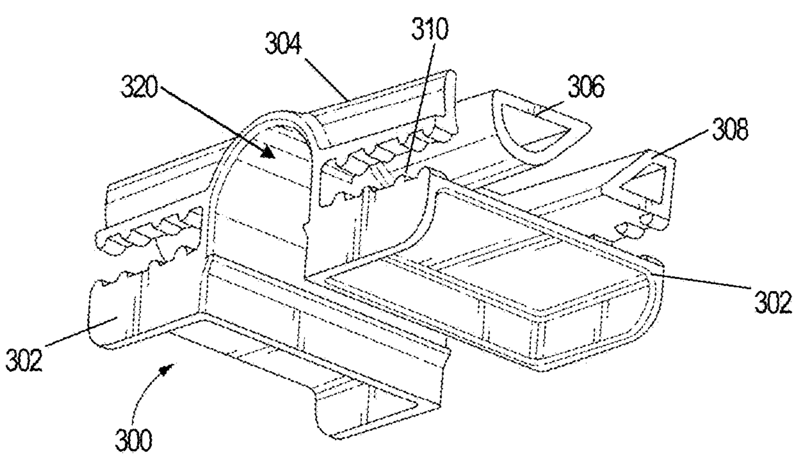
FIG. 16 is a perspective view of an exemplary embodiment of the conductor guide of FIG. 15 according to an illustrative embodiment of the present disclosure.
Figure 17:
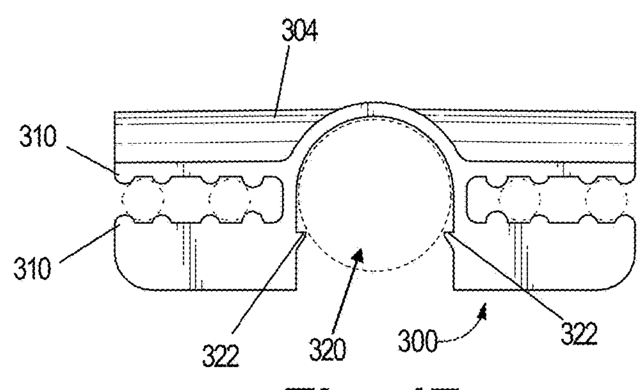
FIG. 17 is an end elevation view of the conductor guide of FIG. 15 according to an illustrative embodiment of the present disclosure.
Figure 18:
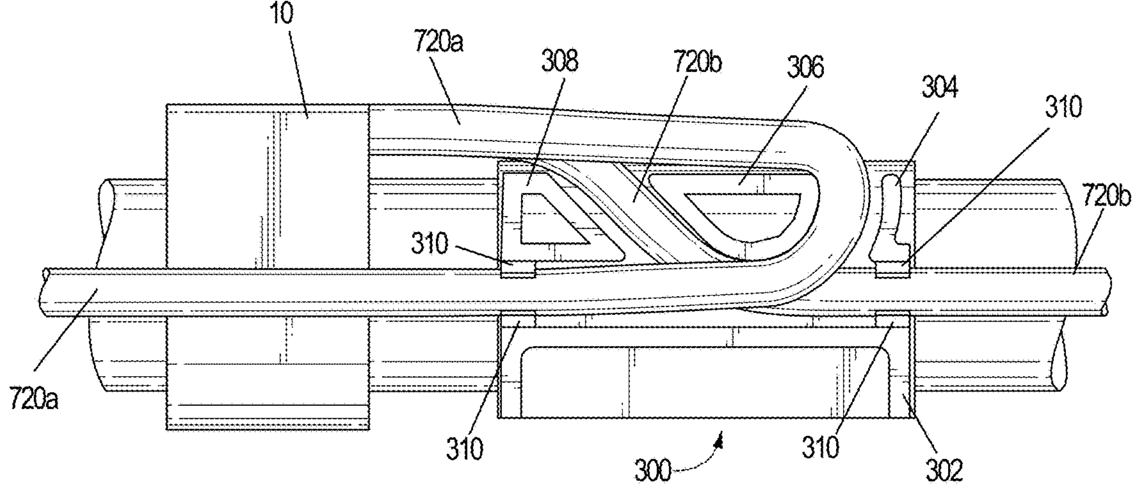
FIG. 18 is a side elevation view of the conductor guide of FIG. 15 according to an illustrative embodiment of the present disclosure.

Cable positioning assembly 300 includes a base 302, a first guide arm 304, a second guide arm 306 and a third guide arm 308. The base 302 and the first guide arm 304 and the third guide arm 308 may include opposing positioning bumps 310 used to maintain the conductors 720 properly positioned in the cable positioning assembly 300 and aligned with the wire channels 111 in first and second cover halves 102, 104. In addition to providing strain relief, cable positioning assembly 300 allows cables to enter or exit the cover assembly 100 from opposite sides of the cover assembly 100. For example, as shown in FIG. 18, branch conductors **720*a* and 720*b* extend from opposite sides of cable positioning assembly 300. Branch conductor 720*a* extends from connector 10 and passes between the gap formed between first guide arm 304 and second guide arm 306 as shown, wrapping around and exiting from a first side of cable positioning assembly 300. Branch conductor 720*b* extends from connector 10 and passes between the gap formed between second guide arm 306 and the third guide arm 308 and exiting from the opposite side of cable positioning assembly 300. In addition to properly positioning the conductors, the bends made to the branch conductors 720*a*, 720*b* when positioned in cable positioning assembly 300 also act to provide strain relief for the branch conductors. Run conductor opening 320 is dimensioned to receive and properly position a run conductor 700. Guides 322 extend at least partially along the length of cable positioning assembly 300 and into the run conductor opening 320. According to the present illustrative embodiment, guides 322 extend along the entire length of cable positioning assembly 300 on both sides of run conductor opening 320 as shown in FIGS. 16 and 17. Guides 322 allow the run conductor 720 to be press fit into run conductor opening 320 and maintain run conductor 720 in position in cable positioning assembly 300**.

Figure 15:
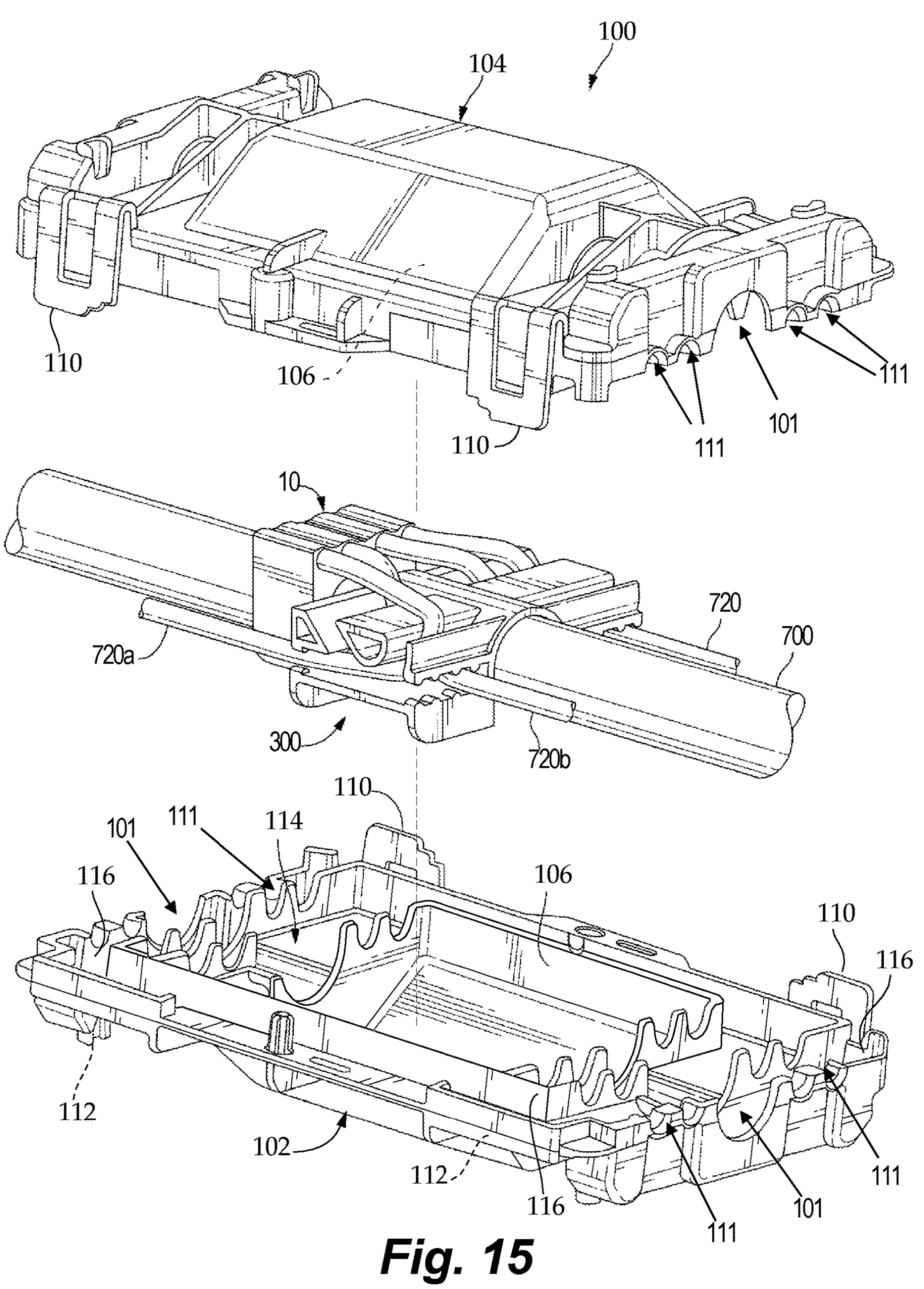
FIG. 15 is perspective view of the first cover half and a second cover half of the cover assembly of FIG. 1 and a conductor guide according to an illustrative embodiment of the present disclosure.

Referring to FIG. 15, once each of the cables is properly positioned in cable positioning assembly 300, the cable positioning assembly 300 is positioned in first cover half 102. For example, cable positioning assembly 300 is positioned within cavity 106 and the branch conductors 720 are positioned in channels 111 and run conductor 700 is positioned within channels 101. Second cover half 104 is then aligned over the first cover half 102 with the aid of alignment pins 115 and alignment openings 119 in each cover half and the first cover half 102 and the second cover half 104 are snapped together using the one or more snap connect arms 110 and one or more corresponding snap connect tabs 112 as described above. It is noted that branch conductors **720*a* and 720*b* will thus extend from opposite sides of the cover assembly 100**.

Figure 19:
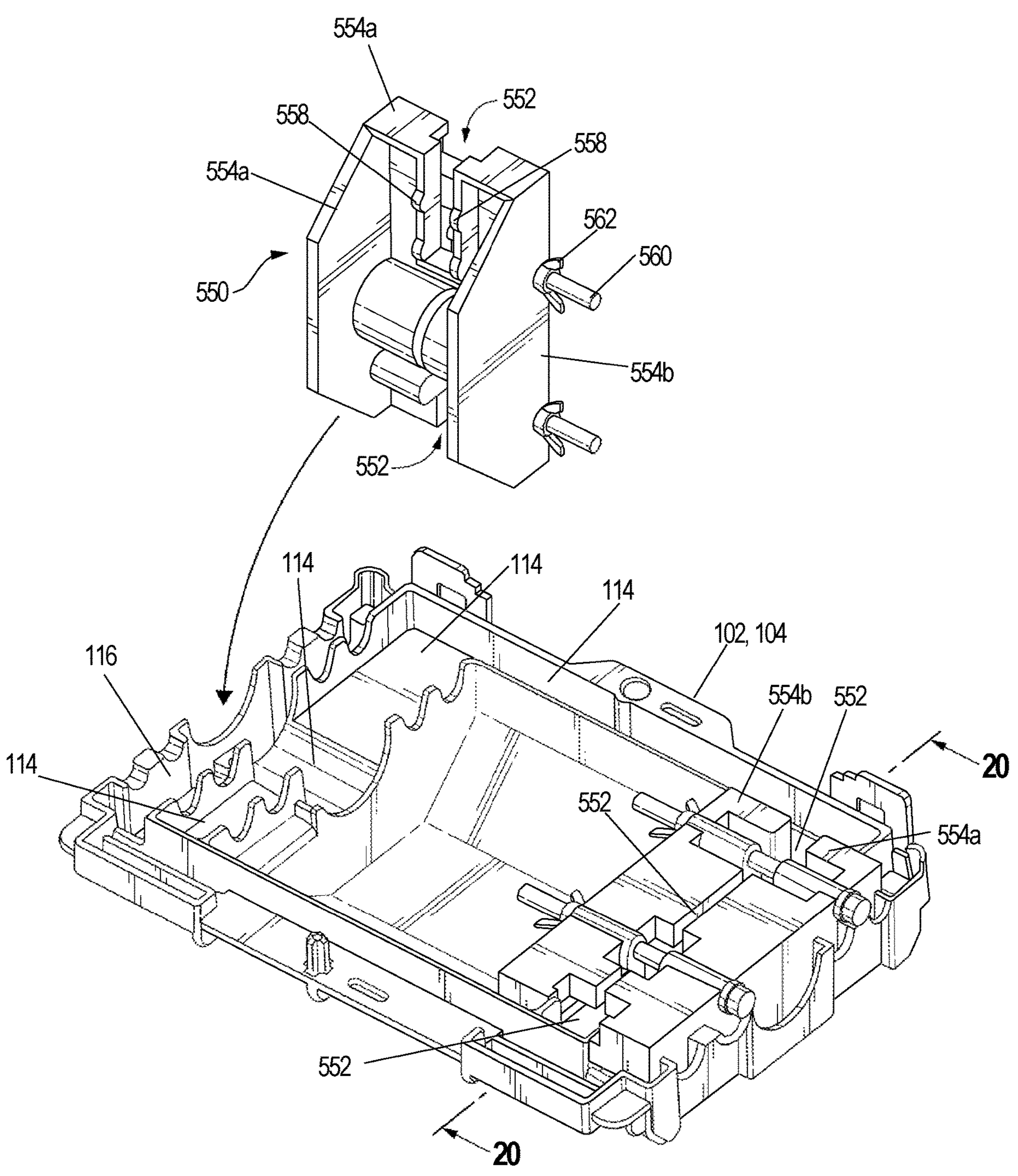
FIG. 19 is a perspective view of a first cover half or the second cover half of the cover assembly of FIG. 1 with a gel pouring jig installed and a gel pouring jig pivoted upward according to an illustrative embodiment of the present disclosure.
Figure 20:
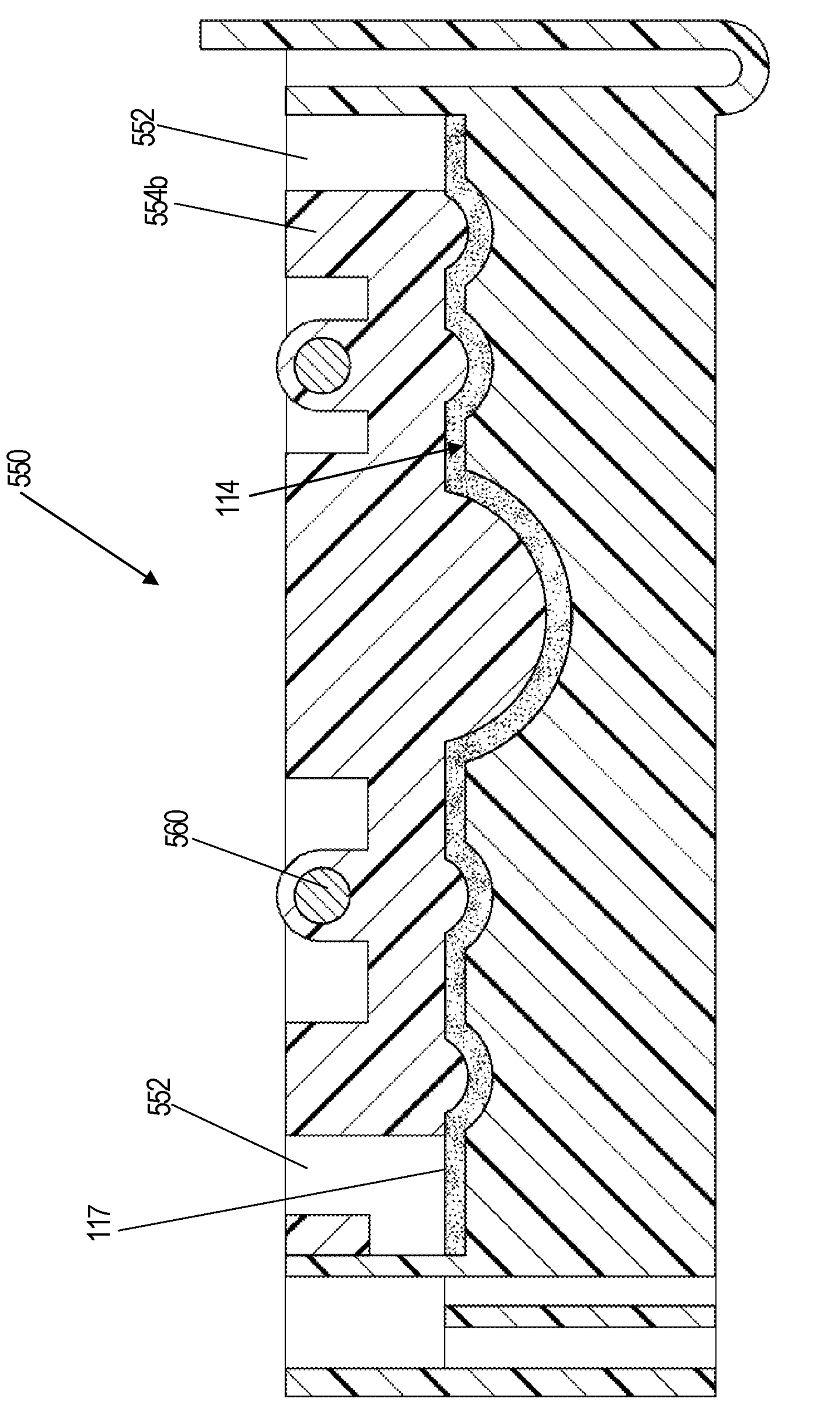
FIG. 20 cross-sectional view of the installed gel pouring jig of FIG. 19 according to an illustrative embodiment of the present disclosure.

Referring now to FIGS. 19 and 20, an exemplary embodiment of a filling jig 550 is shown. The filling jig 550 is used to insert the silicon-based gel 117 into the appropriate portions of cover assembly 100 until the gel can set and the jig 550 then removed. The filling jig 550 includes a first jig half **554*a* and a second jig half 554*b*. The first jig half 554*a* and the second jig half 554*b* are joined by threaded rods 560. The gap between first jig half 554*a* and second jig half 554*b* can be adjusted using wing nuts 562 so that a snug fit of the first and second jig halves 554*a*, 554*b* to the gel receiving portions 114 of the cover assembly 100 can be obtained. The filling jigs 550 are positioned in the cover half 102 or 104 as shown in FIG. 19 so that openings 552 in the filling jigs form gel pour points so that sealing gel can be poured into the openings 552 and into gel receiving portions 114 of cover halves 102 and 104 of cover assembly 100. The gel is permitted to at least slightly harden or set so the gel is no longer in a liquid state before the filling jig is removed. The filling jig 550 thus allows the sealing gel to enter locations on the cover halves 102 and 104** at points where the gel can perform its sealing function without having unnecessary gel in other parts of the cover halves.

A cover assembly according to another illustrative embodiment of the present disclosure is shown in FIGS. 21-39 and is referred to generally as cover assembly 600. Cover assembly 600 is configured to snap together over the crimped connector, e.g., connector 10, to provide protection to the connections from the environment and, in particular to limit or prevent water penetration. Preferably, the cover is configured as a single piece of injection molded plastic that is self-mating. That is, there are two identical cover pieces that connect or mate to one another to form the complete cover assembly when one of the pieces is rotated. For example, a first cover half may be rotated 180 degrees along its longitudinal and/or lateral axes and then connected or mated with the second cover half. According to the present illustrative embodiment, the cover assembly 600 has a first cover half 602 and a second cover half 604 configured and dimensioned to connect to each other. Preferably, the first cover half 602 and second cover half 604 are identical to simplify the manufacture of the cover assembly. For the purposes of the present disclosure and ease of description, the first cover half 602 and second cover half 604 are considered identical such that the description of the first cover half 602 is the same for the second cover half 604. In the embodiment shown, the first cover half 602 has a cavity 606 that is preferably centrally located in the first cover half 602. The cavity 606 is configured and dimensioned to receive a run conductor 700 and one or more branch conductors 720 that are crimped to a connector, e.g., connector 10. When the first cover half 602 is joined, connected or mated with the second cover half 604, the two cavities 606 are joined to form a pocket 608, seen in FIG. 21. The cavity 606 of the first cover half 602 may also include one or more walls 610 defining a space 612 configured and dimensioned to receive the connector, e.g., connector 10, with a run conductor 700 and one or more branch conductors 720 crimped thereto, as seen in FIG. 24. The first cover half 602 may also include one or more strain relief cavities 614 at each end of the first cover half 602. When the first cover half 602 is joined, connected or mated with the second cover half 604, the one or more strain relief cavities 614 are joined to form individual strain relief pockets at each end of the cover assembly 600. Each strain relief cavity 614 is configured and dimensioned to receive at least a portion of a strain relief 630 such that the strain relief pocket positions and retains each strain relief 630 in the cover assembly 600.

Figure 21:
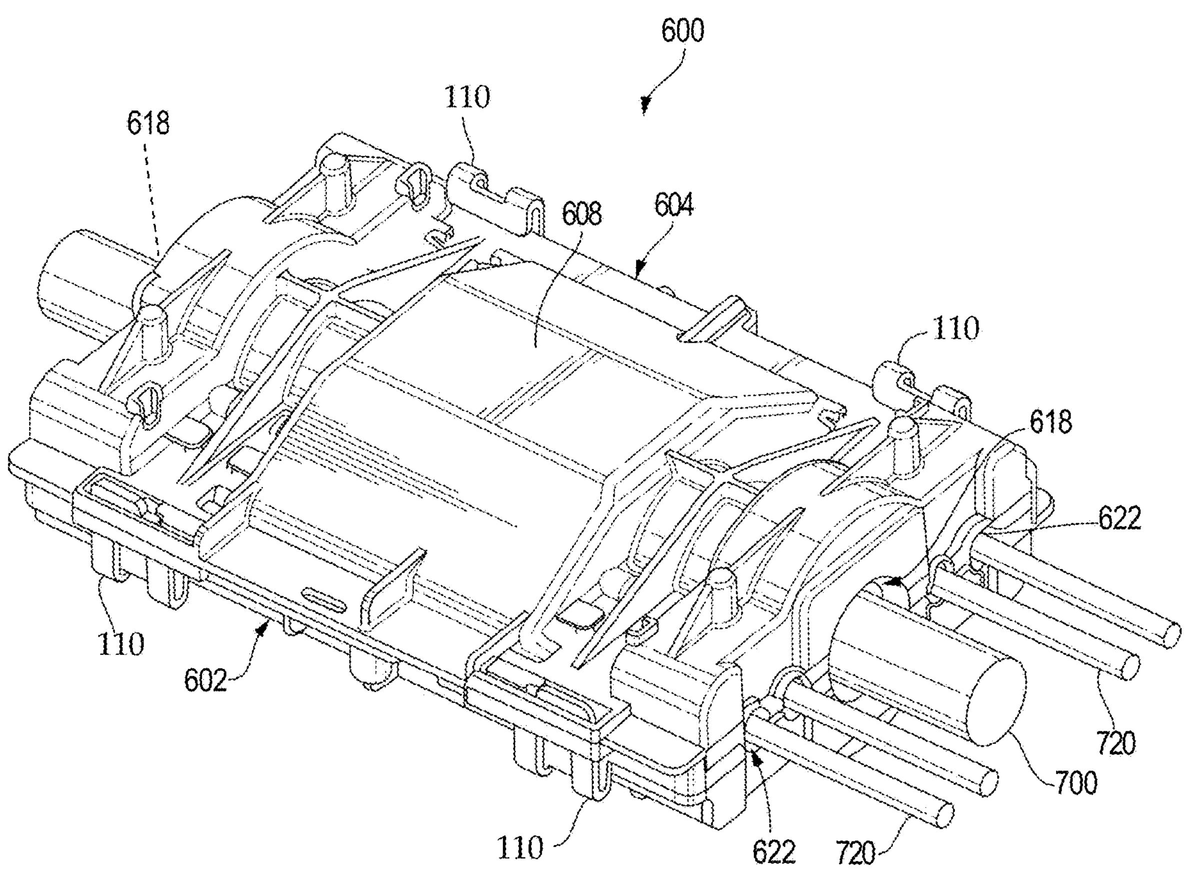
FIG. 21 is a perspective view of a cover assembly according to another illustrative embodiment of the present disclosure, illustrating a first cover half mated to a second cover half.

To permit conductors, e.g., run conductor 700 and branch conductors 720, to pass into and/or through the cover assembly 600, the first cover half 602 and the second cover half 604 include a run conductor channel portion 616 such that when the first cover half 602 is joined, connected or mated with the second cover half 604, the two run conductor channel portions 616 are joined to form a run conductor opening 618 at each end of the cover assembly 600, seen in FIG. 21. Similarly, the first cover half 602 and the second cover half 604 include one or more branch conductor channel portions 620 such that when the first cover half 602 is joined, connected or mated with the second cover half 604, the one or more branch conductor channel portions 620 are joined to form one or more branch conductor openings 622 at each end of the cover assembly 600. As described above, the one or more branch conductor openings 622 are provided at each end of the cover assembly 600 such that branch conductors that enter the cover assembly 600 from the end of the cover assembly 600 closest to the connector, e.g., connector may have to be looped or bent within the cover assembly 600 in order for the connector 10 to properly sit in the space 612. In such instances, the one or more walls 610 defining the space 612 may also serve to limit the bend radius or angle of the branch conductors 720 as they are being bent in the cover assembly 600.

Figure 23:
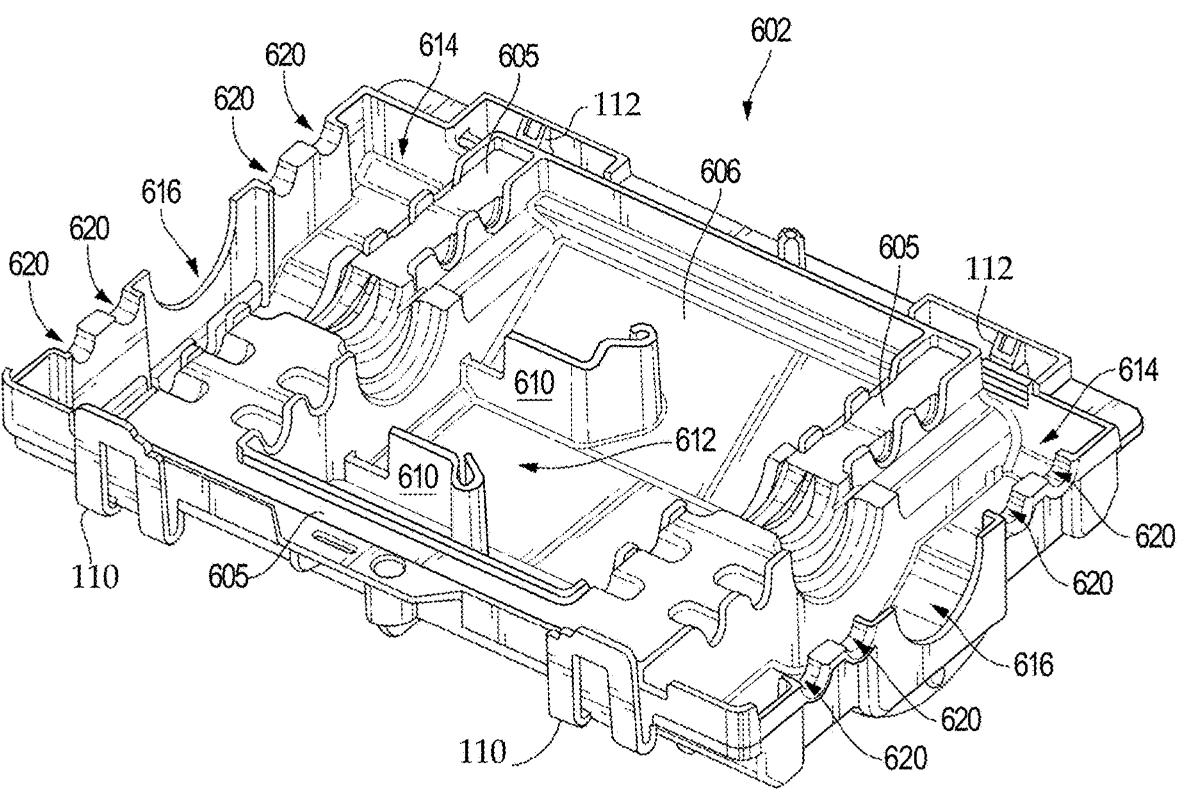
FIG. 23 is an inside perspective view of the first cover half of FIG. 21, illustrating the seal member positioned in the first cover half according to an illustrative embodiment of the present disclosure.
Figure 24:
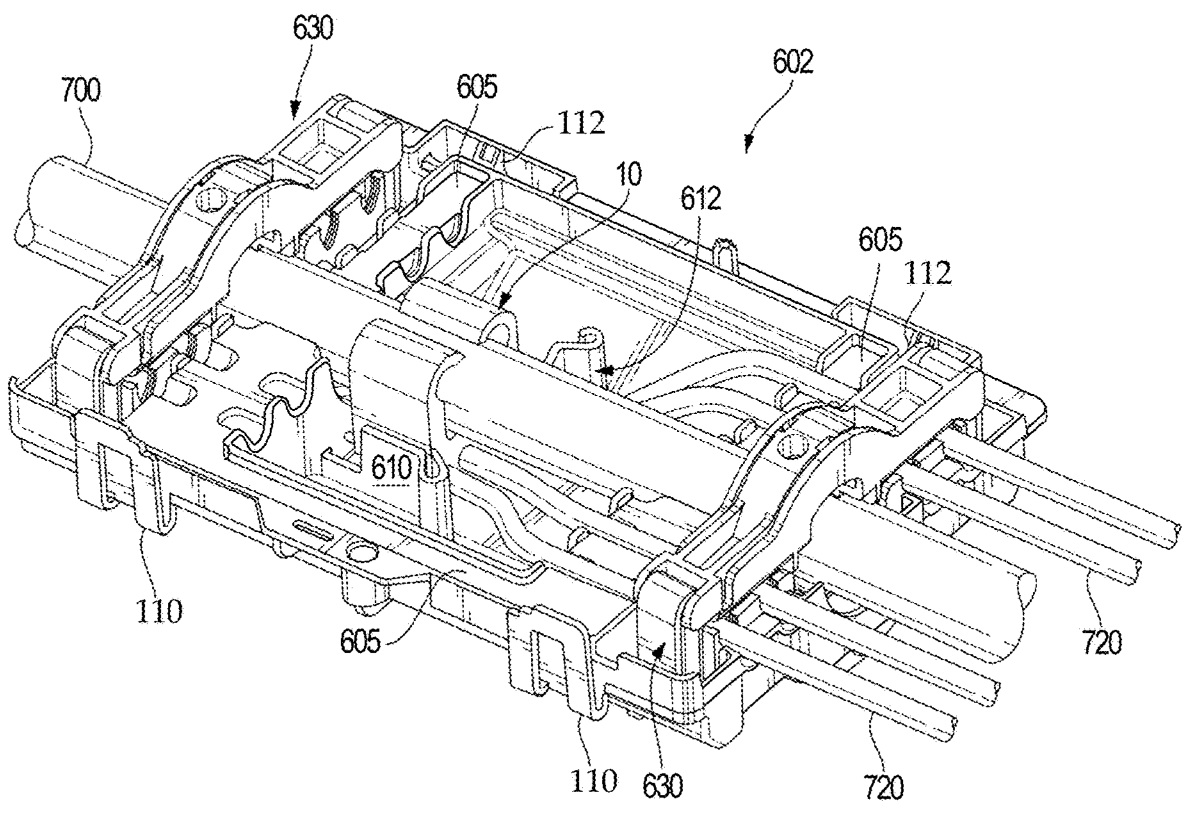
FIG. 24 is an inside perspective view of the first cover half of FIG. 21, illustrating the seal member positioned in the first cover half and the multiple strain relief assemblies and electrical conductors positioned in the first cover half according to an illustrative embodiment of the present disclosure.
Figure 25:
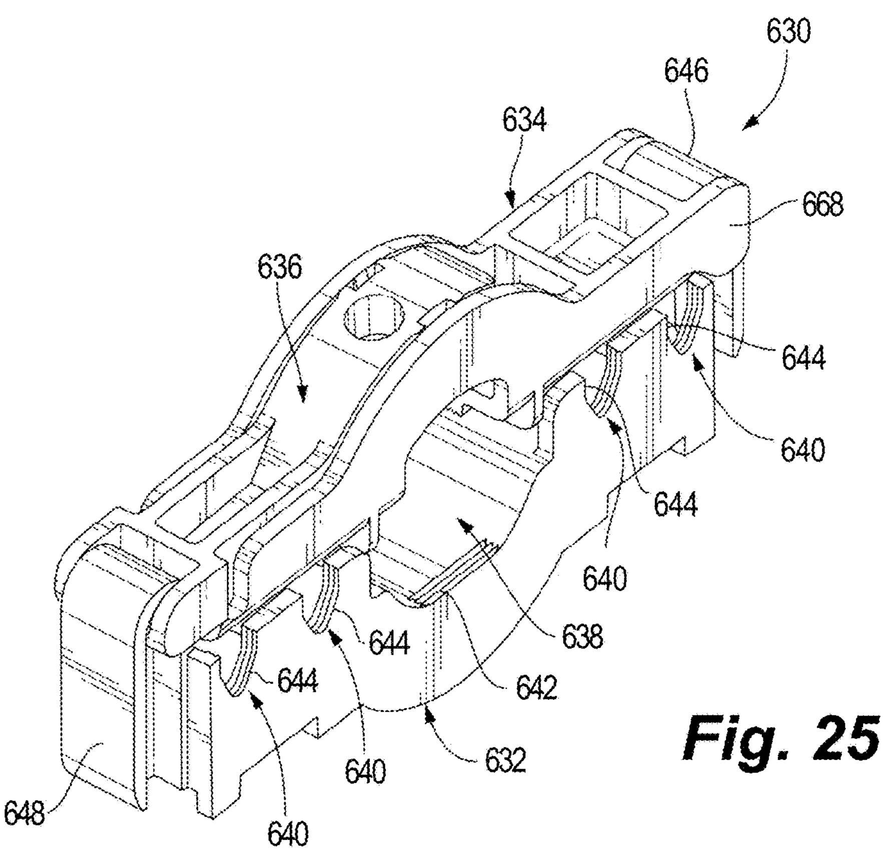
FIG. 25 is a perspective view of a strain relief assembly according to an illustrative embodiment of the present disclosure, illustrating a base, an upper arm and a locking arm.
Figure 26:
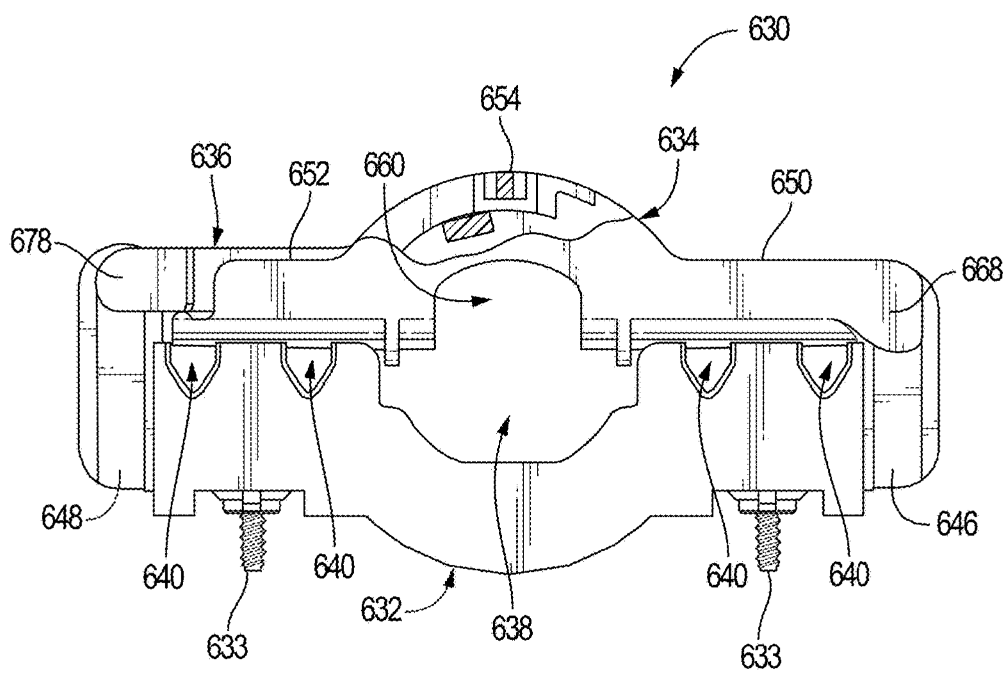
FIG. 26 is a side elevation view of the strain relief assembly of FIG. 25 according to an illustrative embodiment of the present disclosure.

Referring to FIGS. 22A and 23, the first cover half 602 and the second cover half 604 of the cover assembly 600 may also include one or more ledges, channels or other features 624 that allow the outer perimeter of each cover half 602 and 604 to have a seal member 605 positioned thereon. The seal members positioned in the first cover half 602 and the second cover half 604 abut and provide a seal around the run conductor 700 and branch conductors 720 when the two cover halves 602 and 604 are joined, connected or mated together that limits and possibly prevents water from entering the pocket 608. A non-limiting example of the seal member 605 may be a silicone gel or a silicone-based gel or rubber insulating material. Seal member 605 includes one or more arm sections 605*a* joined by edge section 605*b*. Edge section 605*b* gets positioned within channel feature 624 provided along the edge of each cover half 602, 604. Arm sections 605*a* include branch conductor seal portions 605*c*, 605*d* separated by run conductor seal portion 605*e*. Run conductor seal portions 605*e* may include semi-circular recessed portions as shown and are positioned to seal run conductors entering run conductor channel portions 616 in the first cover half 602 and the second cover half 604. According to another illustrative embodiment of the present disclosure, the top of seal member 605 may be a continuous surface 605*f* as shown in FIG. 22B such that the recessed portions are omitted. Branch conductor seal portions 605*c*, 605*d* are positioned to seal branch conductors entering branch conductor channels 620 in the first cover half 602 and the second cover half 604.

According to an illustrative embodiment of the present disclosure, the cover assembly 600 may also include a locking-tab feature that once snapped tight, the locking-tab would be manually lifted before the snap can be opened, similar to that described above with respect to FIGS. 1-6. More specifically, the first cover half 602 includes one or more snap connect arms 110 and one or more corresponding snap connect tabs 112, which are described above. The one or more snap connect arms 110 on the first cover half 602 are configured to connect to a corresponding snap connect tab 112 on the second cover half 604, and the one or more snap connect arms 110 on the second cover half 604 are configured to connect to a corresponding snap connect tab 112 on the first cover half 602. To release a snap connect arm 110 from a corresponding snap connect tab 112, the first cover half 602 and the second cover half 604 may include the tab release arm 113, seen in FIGS. 4-6 and described above. The tab release arm 113 blocks movement of the snap connect arm 110 relative to the snap connect tab 112 to help maintain the interconnection between the snap connect arm 110 and the snap connect tab 112. By moving, e.g., flexing, the tab release arm 113 in a direction away from the cover assembly 600, i.e., in the direction of arrow "X" shown in FIG. 4, the free end 110*a* of the snap connect arm 110 can be flexed so that the snap connect tab 112 is released from the snap connect arm 110, thus releasing the interconnection between the snap connect arm 110 and the snap connect tab 112 and permitting the first cover half 602 to be separated from the second cover half 604.

Referring now to FIGS. 25-31, a strain relief according to an illustrative embodiment of the present disclosure is shown and is referred to as strain relief assembly 630. The strain relief assembly 630 is provided to position the run conductor 700 and the one or more branch conductors 720 for entry into the pocket 608 of the cover assembly 600, and to firmly hold the run conductor 700 and the branch conductors 720 together to provide protection from heavy external loads on the conductors. The strain relief assembly 630 is a multi-piece unit that is preferably made of a non-conductive material such as plastic. In the exemplary embodiment shown, the strain relief assembly 630 is a three-piece assembly that includes a base 632, an upper arm 634 and a locking arm 636. The base 632 is configured and dimensioned to fit at least partially within one of the one or more strain relief cavities 614 at each end of the first cover half 602 (e.g., see FIG. 24). The base 632 includes a first run conductor gripping portion 638 and one or more first branch conductor gripping portions 640. The first run conductor gripping portion 638 is configured and dimensioned to receive and grip at least a portion of a run conductor 700. The first run conductor gripping portion 638 may include one or more grip enhancing members or features 642. For example, the one or more grip enhancing members or features 642 may be teeth or serrations that engage the insulating jacket surrounding the run conductor 700. Each first branch conductor gripping portion 640 is configured and dimensioned to receive and grip at least a portion of a branch conductor 720. Each of the one or more first branch conductor gripping portions 640 may include one or more grip enhancing members or features 644. For example, the one or more grip enhancing members or features 644 may be teeth or serrations that engage the insulating jacket surrounding the branch conductors 720. The base 632 also includes a first arm guide rail 646 and a second arm guide rail 648. The first arm guide rail 646 is configured to interact with the upper arm 634 to movably and pivotably couple the upper arm 634 to the base 632. The second arm guide rail 648 is configured to interact with the locking arm 636 to movably and pivotably couple the locking arm 636 to the base 632.

The upper arm 634 includes a first cable retention portion 650, a second cable retention portion 652 and a bridge portion 654 connecting the first cable retention portion 650 to the second cable retention portion 652. The first cable retention portion 650 is provided to hold and grip one or more branch conductors 720, and the second cable retention portion 652 is provided to hold and grip one or more branch conductors 720. In the embodiment shown, the first cable retention portion 650 has a substantially flat cable pressing surface 650*a*, and the second cable retention portion 652 has a substantially flat cable pressing surface 652*a*. The cable pressing surfaces 650*a* and 652*a* are provided to hold and grip branch conductors 720 in the one or more first branch conductor gripping portions 640. The cable pressing surface 650*a* may include one or more grip enhancing members or features 656, and cable pressing surface 652*a* may include one or more grip enhancing members or features 658. For example, the one or more grip enhancing members or features 656 and 658 may be teeth or serrations that engage the insulating jacket surrounding the branch conductors 720. The second cable retention portion 652 may include a leverage member 653, e.g., a bump, that generates a mechanical advantage, e.g., leverage, to amplify the force applied to the cables or, conversely, to limit the force required by technician installing the cover assembly to lock the locking arm 636 to the upper arm 634 to a more comfortable level. The bridge portion 654 of the upper arm 634 includes a second run conductor gripping portion 660 that is configured and dimensioned to receive and grip at least a portion of the run conductor 700 resting in the first run conductor gripping portion 638. The second run conductor gripping portion 660 may include one or more grip enhancing members or features 661, such as teeth or serrations that engage the insulating jacket surrounding the run conductors 700. The bridge portion 654 may also include one or more release arms 662. The one or more release arms 662 in combination with the release opening 677 in the locking arm 636 are provided to allow quick release of the locking arm 636. The one or more release arms 662 may also act as a stop to block motion of the locking arm 636 as the locking arm moves from an open position to a locking position. The bridge portion 654 may also include one or more snap arms 664 configured to interact with snap recesses 676 in the locking arm 636 to provide a snap-locking feature that interconnects the upper arm 634 and the locking arm 636 to lock the arms 634 and 636 in position relative to the base 632 to hold and retain the run conductor and the branch conductors in the strain relief assembly 630. To movably and pivotably couple the upper arm 634 to the base 632, the upper arm includes a carriage like assembly 666 that includes a pair of side walls 668 extending from one end of the first cable retention portion 650 of the upper arm 634, and one or more guide members 670 that are configured to interact with the first arm guide rail 646 such that the upper arm 634 is slidably coupled to or otherwise interconnected to the first arm guide rail 646 and pivotable or rotatable relative to the first arm guide rail 646.

Figures 27, 28, 29:
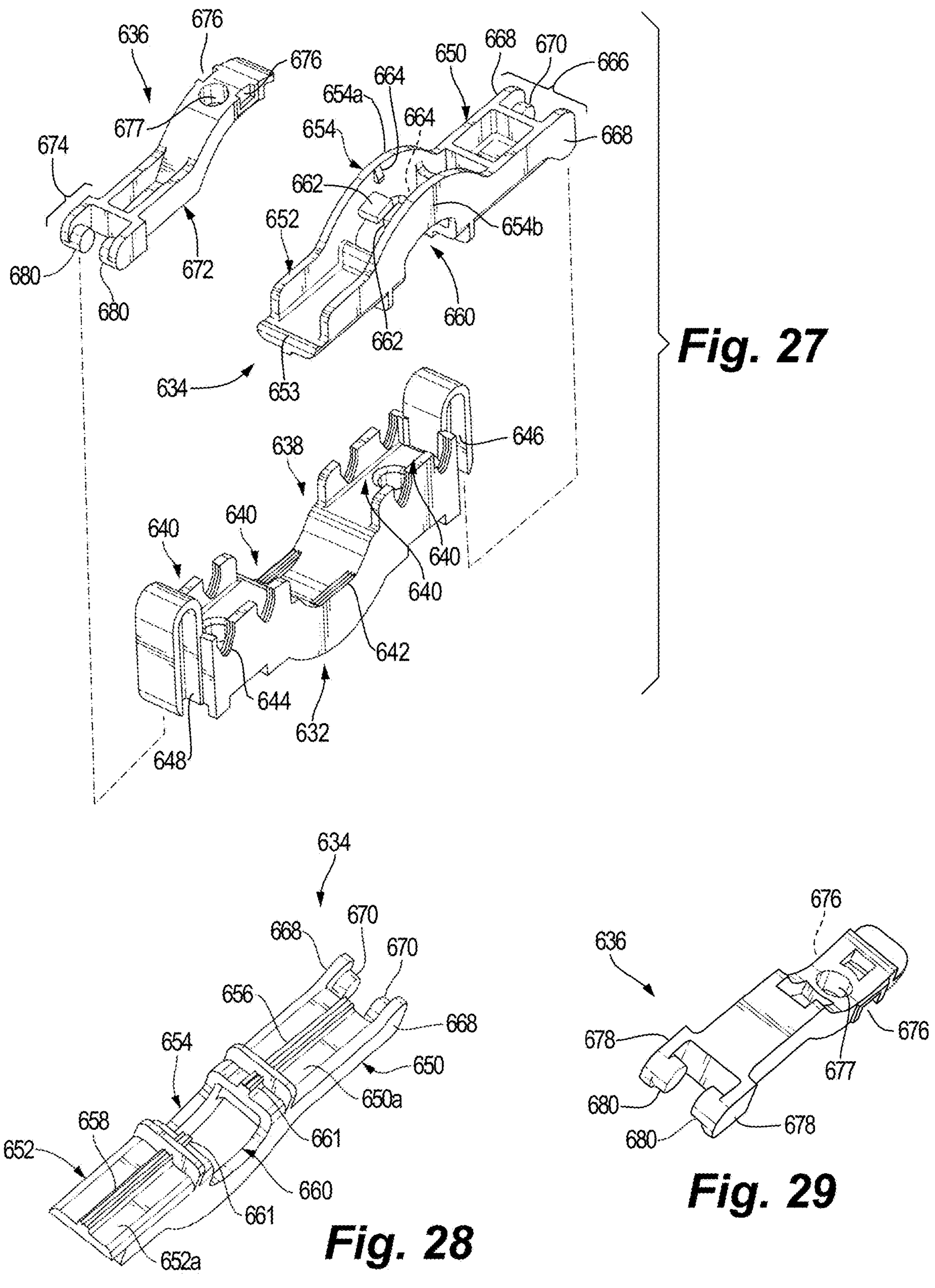
FIG. 27 is an exploded perspective view of the strain relief assembly of FIG. 25, illustrating the base, the upper arm and the locking arm according to an illustrative embodiment of the present disclosure.
FIG. 28 is a bottom perspective view of the upper arm of the strain relief assembly of FIG. 25 according to an illustrative embodiment of the present disclosure.
FIG. 29 is a bottom perspective view of the locking arm of the strain relief assembly of FIG. 25 according to an illustrative embodiment of the present disclosure.

The locking arm 636 is movable and pivotably coupled to the base 632 and is provided to lock the upper arm 634 to the base 632 to hold and retain the run conductor and the branch conductors in the strain relief assembly 630. The locking arm 636 includes a body 672 having a carriage-like assembly 674 at one end of the body and one or more locking slots 676 at an opposite end of the of the body 672, as shown in FIGS. 27 and 29. To movably and pivotably couple the locking arm 636 to the base 632, the carriage-like assembly 674 includes a pair of side walls 678 and one or more guide members 680 that are configured to interact with the second arm guide rail 648 such that the locking arm 636 is slidably coupled to or otherwise interconnected to the second arm guide rail 648 and pivotable or rotatable relative to the second arm guide rail 648. As noted above, the locking slots 676 are configured to interconnect with the snap arms 664 of the upper arm 634 when the locking arm 636 is in the locking position. To release the interconnection between the locking arm 636 and the upper arm 634, a user, e.g., a technician, may insert a flat-head screwdriver (not shown) through the release opening 677 in the locking arm 636 and position the flat-head of the screwdriver between the one or more release arms 662 and rotate the screwdriver so that flat-head of the screwdriver causes the one or more release arms 662 to move apart. Moving the one or more release arms 662 apart causes the side walls 654*a* and 654*b* of the bridge portion 654 to spread apart, e.g., flex, so that the one or more snap arms 664 in the bridge portion 654 of the upper arm 634 are released from corresponding snap recesses 676 in the locking arm 636 due to the release of built-up tension against the cables.

It is noted that the strain relief assemblies of the present disclosure are designed so that the components, particularly the upper arm 634, flex as they contact and hold the conductors, e.g., conductors 700 and 720. This flexure helps develop sufficient force for the strain relief assembly to grip the conductors, e.g., conductors 700 and 720. The strain relief assemblies of the present disclosure can accommodate multiple tap and run conductor sizes through interchangeable components, namely the base 632, the upper arm 634 and the locking arm 636. For example, the base 632 includes one or more first branch conductor gripping portions 640, e.g., pockets, for a specific gauge of branch conductor, such as 8 AWG or 10 AWG branch conductors. To accommodate a different branch conductor gauge the base 632 can be changed with a base 632 rated for the different branch conductor gauge. As another example, the upper arm 634 includes one or more grip enhancing members or features 661 placed specifically to grip one size of run conductor 700, e.g., a 500 Kcmil conductor, 600 Kcmil conductor or 750 Kcmil conductor, and the run conductor can be varied by changing the upper arm 634 configured to work with, for example, a 500 Kcmil conductor, a 600 Kcmil conductor or a 750 Kcmil conductor. Optionally, run conductor grip enhancing members and/or branch conductor grip enhancing members may be provided on the base 632 and/or arm 634 and may include or be mounted on flexible structures such as for example, cantilevered structures. This may allow even greater range of cable diameter compatibility such that, for example, a single design of base 632 could be used with different sized conductors including, for example 8 AWG or 10 AWG branch conductors.

Figure 30:
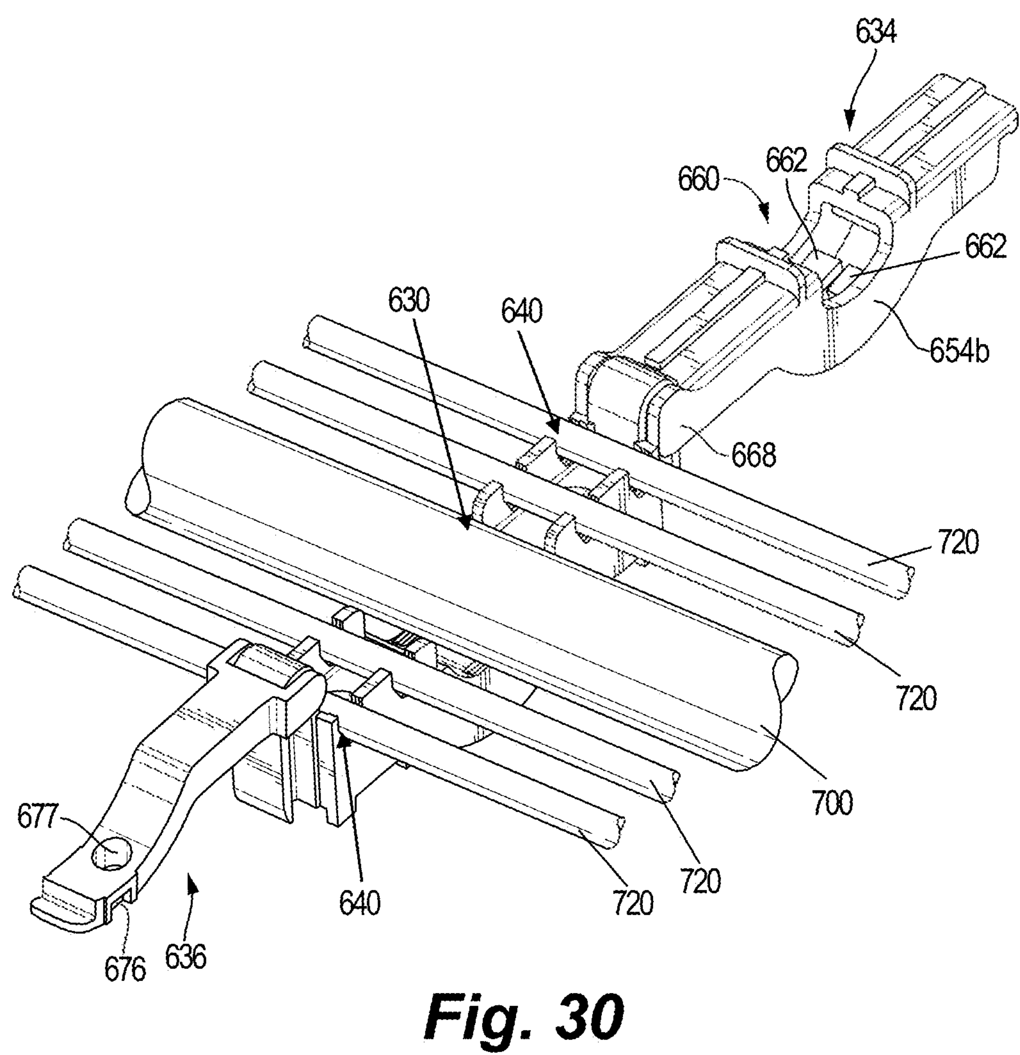
FIG. 30 is a perspective view of the strain relief assembly of FIG. 25 with cables positioned with respect thereto according to an illustrative embodiment of the present disclosure.
Figure 31:
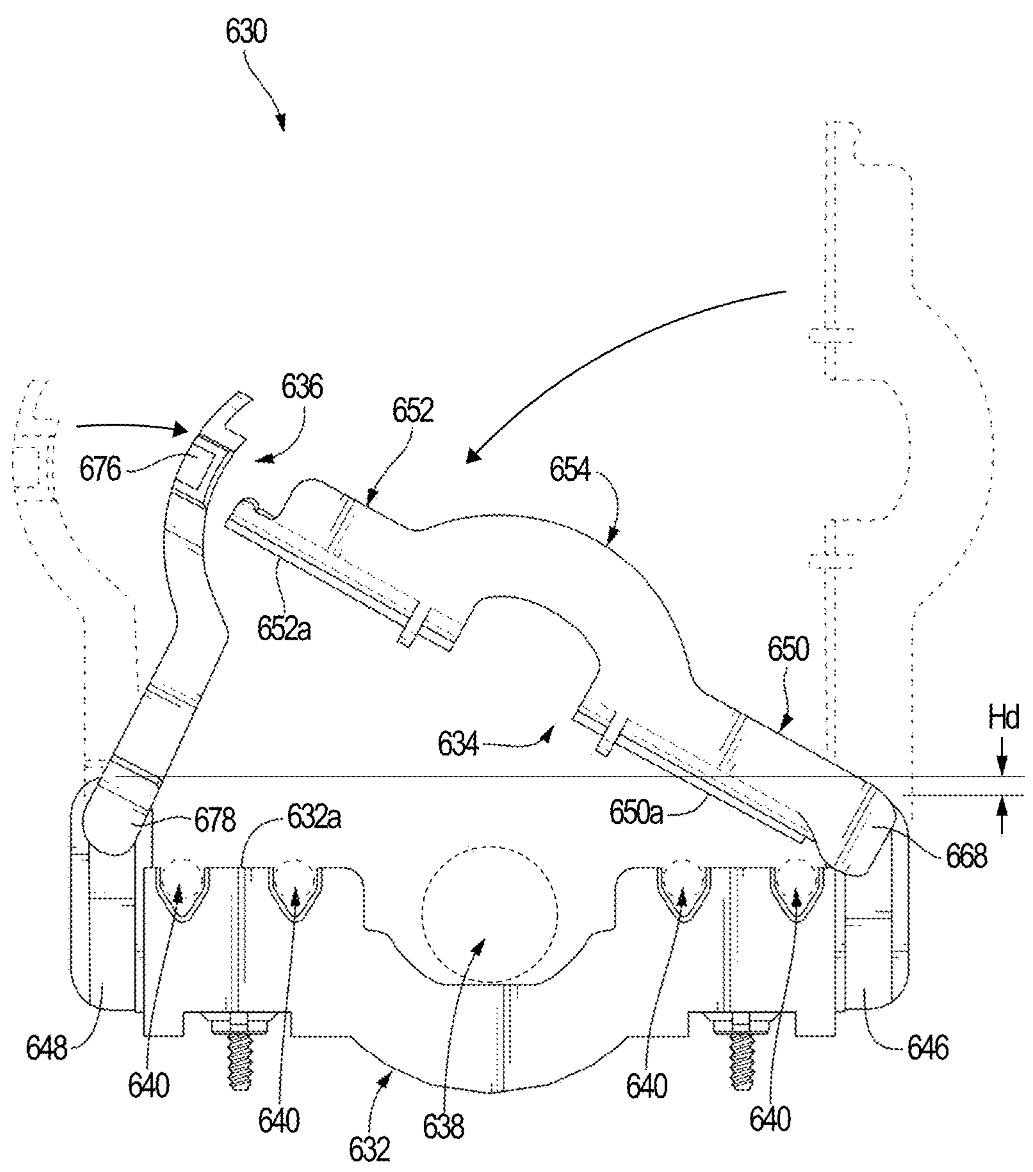
FIG. 31 is an end elevation view of the strain relief assembly of FIG. 25 showing a sequence of closure in phantom according to an illustrative embodiment of the present disclosure.

Referring to FIGS. 30 and 31, to secure the run conductor 700 and the one or more branch conductors 720 to the strain relief assembly 630, the locking arm 636 and the upper arm 634 are moved to an open position seen in FIG. 30. In the open position, the upper arm 634 and the locking arm 636 are pivoted away from the base 632 so that a run conductor 700 can be inserted into the first run conductor gripping portion 638, and so that one or more branch conductors 720 can be inserted into the first branch conductor gripping portions 640. The run conductor 700 and the one or more branch conductors 720 are then positioned in the first run conductor gripping portion 638 and the first branch conductor gripping portions 640, respectively as shown in FIG. 30. The upper arm 634 is then pivoted or rotated towards a closed position, as shown by the arrow in FIG. 31. In the closed position, the upper arm 634 is pivoted toward the base 632 until the cable pressing surface 650*a* of the first cable retention portion 650 and the cable pressing surface 652*a* of the second cable retention portion 652 are in close proximity to and possibly in contact with the base 632. The locking arm 636 is then pivoted or rotated as shown by the arrow in FIG. 31 to a locking position. For example, the locking arm 636 is pivoted or rotated toward the upper arm 634 until the one or more snap recesses 676 in the body 672 of the locking arm 636 pass the one or more snap arms 664 on the bridge portion 654 to lock the upper arm 634 in position relative to the base 632 to hold and retain the run conductor and the branch conductors in the strain relief assembly 630. It is noted that the height of the second arm guide rail 648 from a upper surface 632*a* of the base 632 is greater than the height of the first arm guide rail 646 from a upper surface 632*a* of the base 632 such that there is a height difference "Hd" that allows the upper arm 636 to apply sufficient force to the run conductor 700 and the one or more branch conductors 720 to retain and hold the conductors within the strain relief assembly 630.

Figures 32, 33:
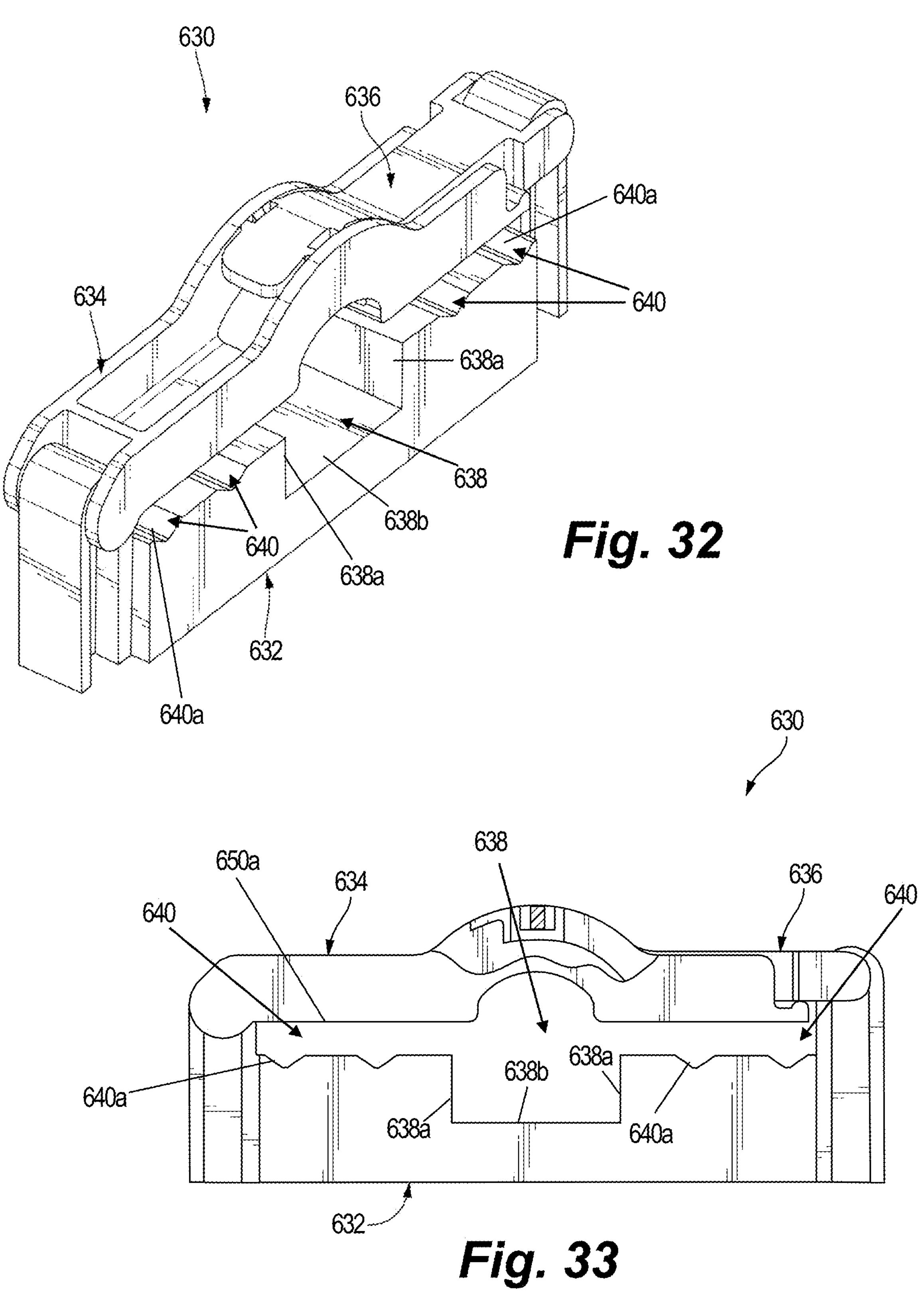
FIG. 32 is a perspective view of a strain relief assembly according to another exemplary embodiment of the present disclosure, illustrating a base, an upper arm and a locking arm.
FIG. 33 is a side elevation view of the strain relief assembly of FIG. 32 according to an illustrative embodiment of the present disclosure.
Figure 34:
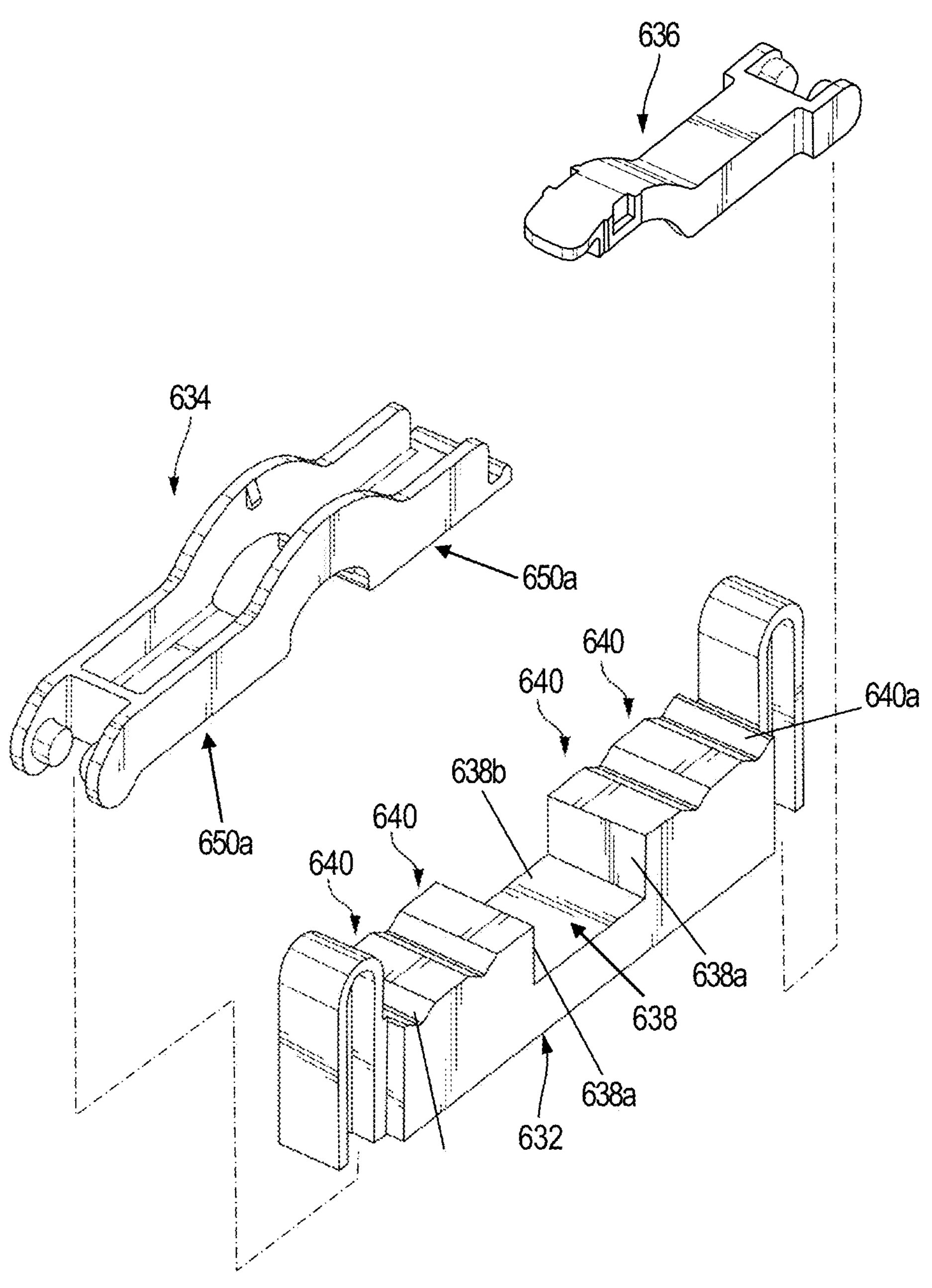
FIG. 34 is an exploded perspective view of the strain relief assembly of FIG. 32, illustrating the base, the upper arm and the locking arm according to an illustrative embodiment of the present disclosure.

Referring to FIGS. 32-34, another exemplary embodiment of the one or more strain relief assemblies according to the present disclosure is shown. The strain relief assembly 630 is provided to position the run conductor 700 and the one or more branch conductors 720 for entry into the pocket 608 of the cover assembly 600, and to firmly hold the run conductor 700 and the branch conductors 720 together to provide protection from heavy external loads on the conductors. As described above, the strain relief assembly 630 is a multi-piece unit that is preferably made of a non-conductive material such as plastic. In the exemplary embodiment shown, the strain relief assembly 630 is a three-piece assembly that includes a base 632, an upper arm 634 and a locking arm 636. This exemplary embodiment is substantially similar to the embodiment of FIGS. 25-31 in several respects such that like reference numerals are used for like features of the strain relief assembly 630. The difference between this embodiment and the embodiments of FIGS. 25-31 is the first run conductor gripping portion 638 is configured as an opening with substantially flat walls 638*a*, 638*b*, and the first branch conductor gripping portions 640 are configured as V-shaped notches 640*a* in the base 632. In addition, rubber pads (not shown) may be placed on one or more of flat walls 638*a*, 638*b* and/or V-shaped notches 640*a* to be used to aid in gripping the conductors. The rubber pads can also be useful for countering tolerance issues, such as cable diameter tolerance differences.

Figure 35:
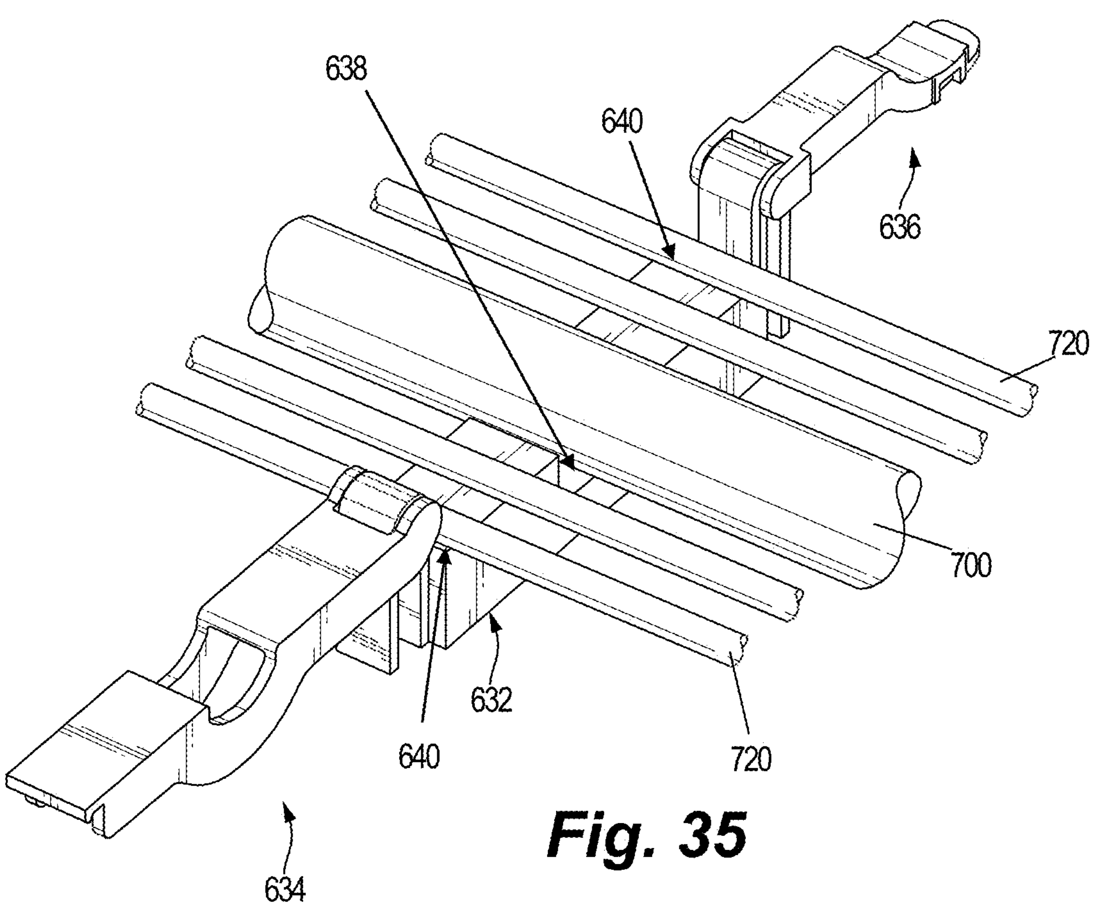
FIG. 35 is an perspective view of the strain relief assembly of FIG. 32 with cables positioned with respect thereto according to an illustrative embodiment of the present disclosure.
Figure 36:
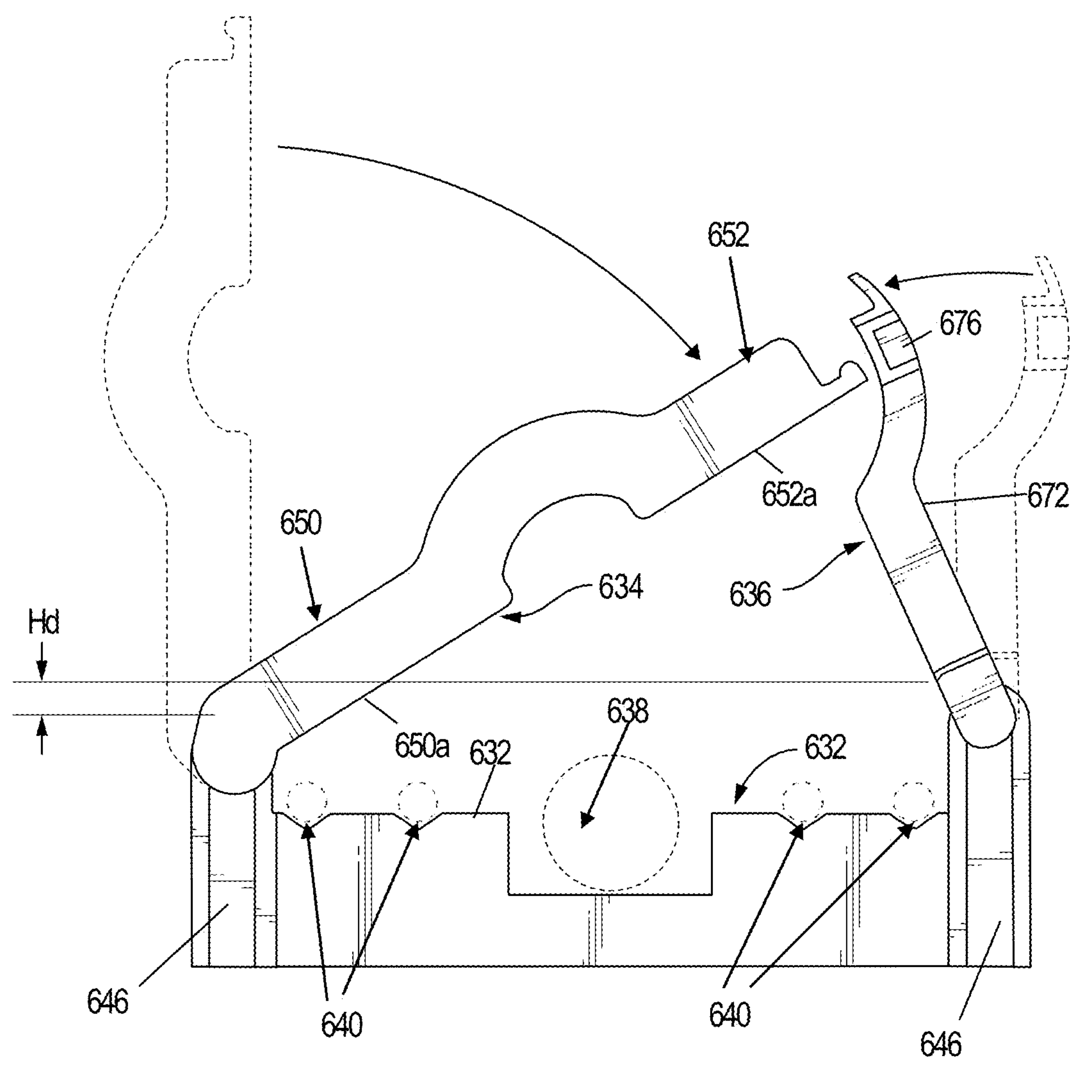
FIG. 36 is an end elevation view of the strain relief assembly of FIG. 32 showing a sequence of closure in phantom according to an illustrative embodiment of the present disclosure.

Referring to FIGS. 35 and 36, to secure the run conductor 700 and the one or more branch conductors 720 to the strain relief assembly 630, the locking arm 636 and the upper arm 634 are moved to an open position seen in FIG. 35. In the open position, the upper arm 634 and the locking arm 636 are pivoted away from the base 632 so that a run conductor 700 can be inserted into the first run conductor gripping portion 638, and so that one or more branch conductors 720 can be inserted into the first branch conductor gripping portions 640. The run conductor 700 and the one or more branch conductors 720 are then positioned in the first run conductor gripping portion 638 and the first branch conductor gripping portions 640, respectively as shown in FIG. 35. The upper arm 634 is then pivoted or rotated towards a closed position, as shown by the arrow in FIG. 36. For example, the upper arm 634 is pivoted toward the base 632 until the cable pressing surface 650*a* of the first cable retention portion 650 and the cable pressing surface 652*a* of the second cable retention portion 652 are in close proximity to and possibly in contact with the base 632. The locking arm 636 is then pivoted or rotated towards a locking position, as shown the arrow in FIG. 36. Continuing by reference to FIGS. 25-31, the locking arm 636 is pivoted or rotated toward the upper arm 634 until the one or more snap recesses 676 in the body 672 of the locking arm 636 pass the one or more snap arms 664 on the bridge portion 654 to lock the upper arm 634 in position relative to the base 632 to hold and retain the run conductor and the branch conductors in the strain relief assembly 630. Returning to FIG. 36, it is noted that the height of the second arm guide rail 648 from a upper surface 632*a* of the base 632 is greater than the height of the first arm guide rail 646 from a upper surface 632*a* of the base 632 such that there is a height difference "Hd" that allows the upper arm 636 to apply sufficient force to the run conductor 700 and the one or more branch conductors 720 to retain and hold the conductors within the strain relief assembly 630.

Figure 37:
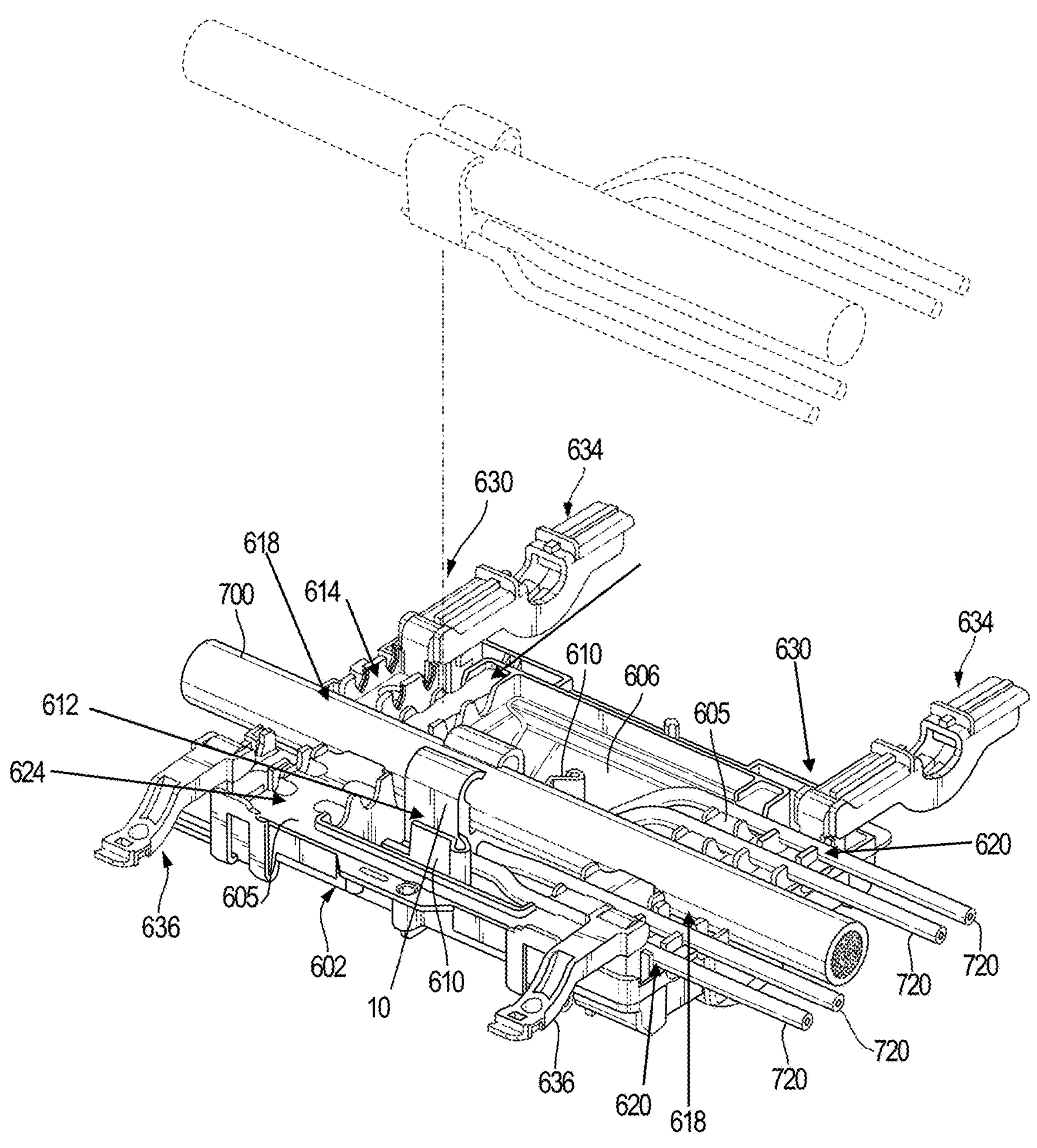
FIG. 37 depicts a first step in the process for installing conductors crimped to the compression connector into the cover assembly of FIG. 21 according to an illustrative embodiment of the present disclosure.
Figure 38:
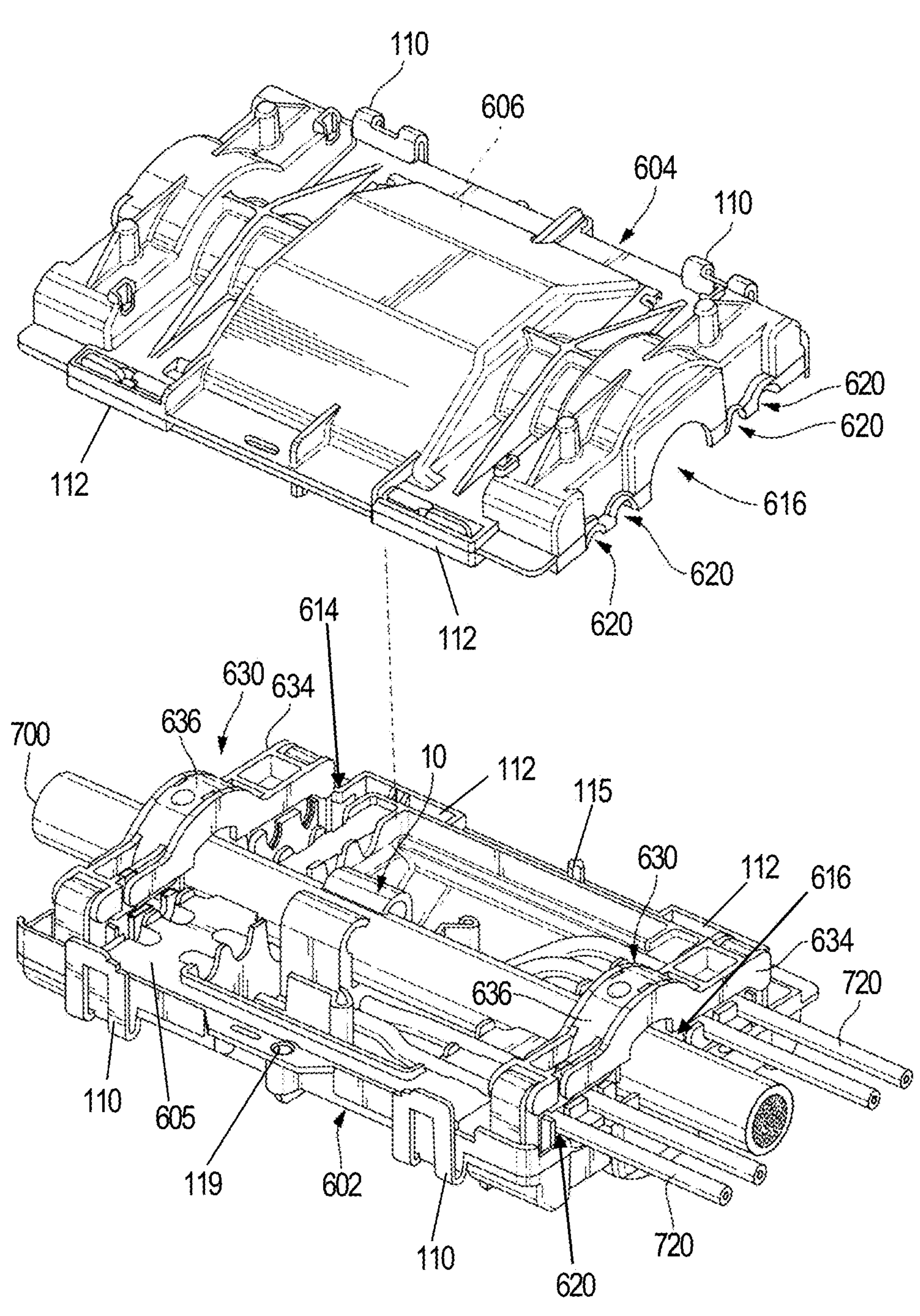
FIG. 38 depict a second step in the process for installing conductors crimped to the compression connector into the cover assembly of FIG. 21 according to an illustrative embodiment of the present disclosure.
Figure 39:
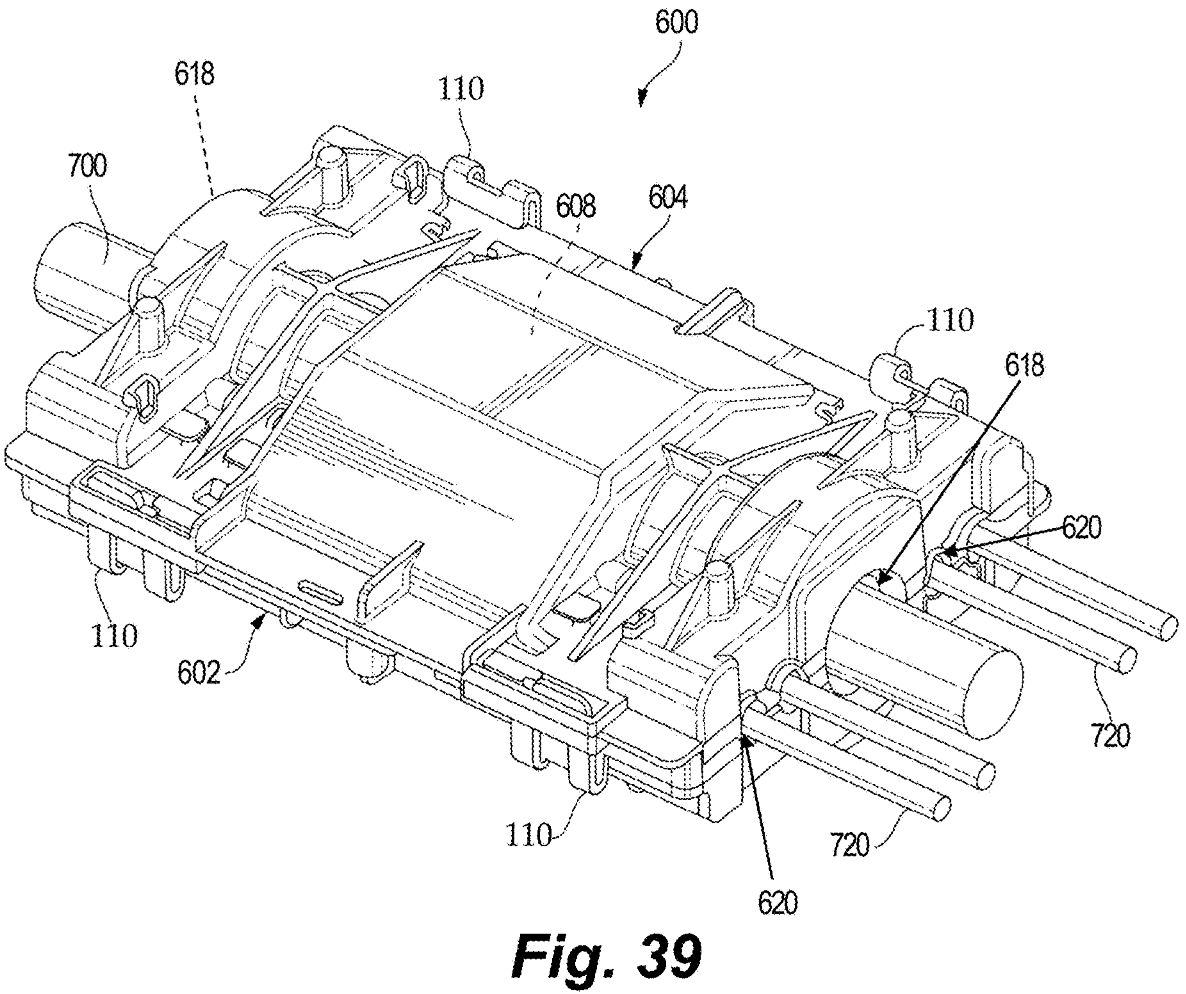
FIG. 39 depicts a third step in the process for installing conductors crimped to the compression connector into the cover assembly of FIG. 21 according to an illustrative embodiment of the present disclosure.

Referring to FIGS. 37-39, exemplary steps for covering or enclosing a run conductor 700 and branch conductors 720 crimped to a connector 10 are shown. In Step 1, the base 632 of two strain relief assemblies 630 are positioned in a strain relief cavity 614 in the first cover half 602. It is noted that the strain relief assemblies 630 may also be secured within the strain relief cavities 614 in the first cover half 602 using fasteners 633, such as plastite screws, shown in FIG. 26. The upper arm 634 and the locking arm 636 are then pivoted to their open positions, as seen in FIG. 37. Seal members 605 are also positioned in the appropriate features 624 in first cover half 602 and second cover half 604. The connector 10 with the run conductor 700 and branch conductors 720 crimped thereto, are then inserted or placed into the first cover half 602 so that the connector 10 is in the connector space 612 in the first cover half 602, the run conductor is resting in the run conductor channel portion 618 in the first cover half 602, and the branch conductors are resting in one or more branch conductor channel portions 620 in the first cover half 602. In Step 2, the upper arms 634 of each strain relief assembly 630 are pivoted or rotated to the closed position, and the locking arms 636 of each strain relief assembly 630 are pivoted or rotated to locking position to secure the run conductor 700 and the branch conductors to the strain relief assemblies 630 as shown in FIG. 38. The second cover half 604 is then aligned with the first cover half utilizing alignment pins 115 and alignment openings 119. Second cover half 604 is pressed down onto the first cover half 602 until the one or more snap connect arms 110 and one or more corresponding snap connect tabs 112 lock the first cover half 602 to the second cover half 604.

Figures 40, 41:
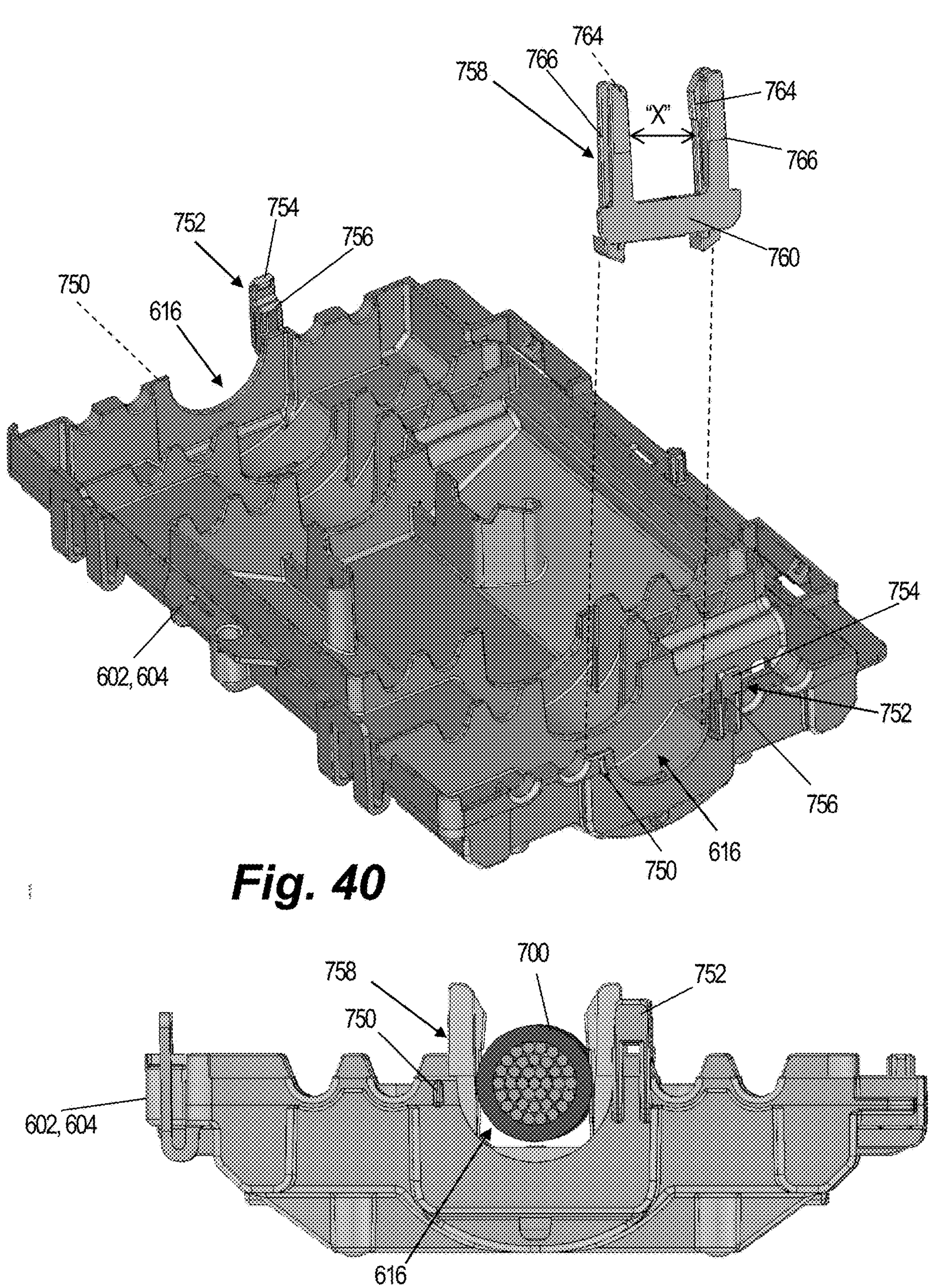
FIG. 40 a perspective view of a first cover half or second cover half and a cable guide according to an illustrative embodiment of the present disclosure.
FIG. 41 is an end elevation view of the first cover half or second cover half and cable guide of FIG. 40 according to an illustrative embodiment of the present disclosure.

A portion of a cover assembly according to another illustrative embodiment of the present disclosure is shown in FIGS. 40 and 41. More specifically, FIG. 40 depicts a cover half 602, 604 which is substantially similar to the cover halves 602, 604 depicted in the embodiment of FIGS. 21 and 22A in several respects such that like reference numerals are used for like features of the cover halves 602, 604. For reasons of brevity, only the different features will be described below and like features will not be described again. The difference between the present embodiment and the embodiment of FIGS. 21 and 22A is the inclusion of additional snap connect arms and snap connect tabs positioned adjacent run conductor channel portions 616 which form run conductor opening 618. These additional snap connect arms and snap connect tabs assist to hold the end portions of cover assembly 600 in a closed position. Each end portion of cover half 602, 604 includes one or more snap connect tabs 750 and one or more snap connect arms 752. The one or more snap connect arms 752 on the first cover half 602 are configured to connect to a corresponding snap connect tab 750 on the second cover half 604, and the one or more snap connect arms 752 on the second cover half 604 are configured to connect to a corresponding snap connect tab 750 on the first cover half 602. Snap connect arms 752 include a ledge like member 756 and lip 754 which engages snap connect tab 750 when the first cover half 602 and the second cover half 604 is in the closed position.

According to various embodiments of the present disclosure, the run conductor channel portions 616 in the first cover half 602 and the second cover half 604 which form run conductor opening 618 when the cover halves are connected are dimensioned to receive run conductors having various diameters. According to an embodiment of the present disclosure, a cable guide 758 may be removably positioned on either or both ends of cover half 602 and cover half 604 adjacent run conductor channel portions 616 as shown in FIG. 41 to accommodate run conductors of various diameters. That is, various cable guides 758 may be provided each of which is dimensioned to receive and secure a run conductor having a different diameter. For example, cable guides 758 include a body 760 having two arms 766. The distance "X" between the two arms 766 may be selected to correspond to the diameter of a run conductor being positioned in the run conductor opening 618. The cable guide 758 effectively closes the gap at the run conductor opening 618 to more securely hold the run conductor 700. Arms 766 of cable guide 758 may include one or more grip enhancing members or features 764. For example, the one or more grip enhancing members or features 764 may be teeth or serrations that engage the insulating jacket surrounding the run conductor 700. Furthermore, the cable guides 758 also promote the insertion of the run conductor in a straight downward motion to avoid inconsistency in the gel displacement that might otherwise occur.

It is noted that the cover assemblies, strain-relief assemblies and cable positioning assemblies described herein provide flexibility in the number of branch conductors that can be used (1-4), and in the exit direction of the branch conductors from the cover assembly. For example, the configurations described herein and contemplated by the present disclosure allow all branch conductors to exit the cover assembly in the same direction, or optionally, one or two of the branch conductors may be reversed to exit the cover assembly in an opposite direction. In addition to protecting the contents of the cover assemblies as described herein, the cover assemblies also protect individuals from hazards associated with having exposed electrical connections.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An enclosure for containing an electrical connector connecting a plurality of conductors, the enclosure comprising:

a first enclosure portion and a second enclosure portion; and at least one strain relief assembly for securing at least one of the plurality of conductors;

wherein the first enclosure portion and the second enclosure portion when joined are configured to receive the at least one strain relief assembly, wherein the at least one strain relief assembly comprises a three-piece assembly comprising a base, an upper arm and a locking arm, wherein the upper arm and the locking arm are pivotably attached to the base.

2. The enclosure as recited in claim 1, wherein the first enclosure portion includes at least one first strain relief cavity and the second enclosure portion includes at least one second strain relief cavity, and wherein the base is configured to fit within at least one of the at least one first strain relief cavity and the at least one second strain relief cavity.

3. The enclosure as recited in claim 1, wherein the base comprises at least one first conductor gripping portion and at least one second conductor gripping portion.

4. The enclosure as recited in claim 3, wherein the plurality of conductors comprise at least one first conductor having a first diameter and at least one second conductor having a second diameter, and wherein the at least one first conductor gripping portion is configured to receive and grip at least a portion of the at least one first conductor.

5. The enclosure as recited in claim 4, wherein the at least one second conductor gripping portion is configured to receive and grip at least a portion of the at least one second conductor.

6. The enclosure as recited in claim 5, wherein the first diameter and the second diameter are different.

7. The enclosure as recited in claim 3, wherein the at least one first conductor gripping portion and the at least one second conductor gripping portion comprise grip enhancing members.

8. An enclosure for containing an electrical connector connecting a plurality of conductors, the enclosure comprising:

a first enclosure portion and a second enclosure portion; and a cable positioning assembly, wherein a distal end of a conductor entering from a first end of the enclosure is guided by the cable positioning assembly back toward the first end of the enclosure for securing to an electrical connector, and wherein the first enclosure portion and the second enclosure portion when joined form at least one cavity for receiving the cable positioning assembly.

9. The enclosure as recited in claim 8, wherein the cable positioning assembly comprises at least one guide arm configured to guide and secure at least one of the plurality of conductors.

10. The enclosure as recited in claim 9, wherein the at least one guide arm comprises a plurality of parallel guide arms configured to guide and secure at least one of the plurality of conductors.

11. An enclosure for containing an electrical connector connecting a plurality of conductors, the enclosure comprising:

a first enclosure portion and a second enclosure portion, the first enclosure portion and the second enclosure portion when joined forming a connector cavity for receiving the electrical connector and the plurality of conductors;

at least one strain relief assembly positionable with respect to the connector cavity; and a seal member positionable between the first enclosure portion and the second enclosure portion when the first enclosure portion and the second enclosure portion are joined, wherein the at least one strain relief assembly comprises a three-piece assembly comprising a base, an upper arm and a locking arm, wherein the upper arm and the locking arm are pivotably attached to the base.

12. The enclosure as recited in claim 11, wherein the seal member comprises a first seal member and a second seal member.

13. The enclosure as recited in claim 12, wherein the first seal member is positioned within a first cavity of the first enclosure portion for sealing at least a first portion of the connector cavity.

14. The enclosure as recited in claim 13, wherein the second seal member is positioned with a second cavity of the second enclosure portion for sealing at least a second portion of the connector cavity.

15. The enclosure as recited in claim 11, wherein the seal member comprises at least one of a substantially flat surface and a concave surface.

16. The enclosure as recited in claim 11, further comprising a cable guide positionable with respect to an opening to the connector cavity for receiving and securing at least one of the plurality of conductors.

17. The enclosure as recited in claim 11, wherein at least one wall forming at least a portion of the connector cavity is configured to limit a bend radius of at least one of the plurality of conductors.

* * * * *